United States Patent [19]

Mizutani et al.

[11] Patent Number: 5,231,284
[45] Date of Patent: Jul. 27, 1993

[54] METHOD AND APPARATUS USING LASER LIGHT FOR DETECTING THE ROTATIONAL POSITION OF A SERVOMOTOR AND THE LIKE

[75] Inventors: Takao Mizutani; Yukio Aoki, both of Nagoya, Japan

[73] Assignee: Mitsubishi Denki K.K., Tokyo, Japan

[21] Appl. No.: 799,298

[22] Filed: Nov. 27, 1991

[30] Foreign Application Priority Data

Jul. 16, 1991 [JP] Japan ................. 3-175286

[51] Int. Cl.$^5$ ................. G01D 5/00; G01D 5/36
[52] U.S. Cl. ................. 250/231.13; 356/375
[58] Field of Search ............. 250/231.13, 231.14, 250/231.16, 231.17, 231.18, 237 G; 356/375; 33/706, 707

[56] References Cited

U.S. PATENT DOCUMENTS

| | | | |
|---|---|---|---|
| 4,233,592 | 11/1980 | Leichle | 250/231.14 |
| 4,634,862 | 1/1987 | Matsunaga et al. | 250/231.14 |
| 4,639,595 | 1/1987 | Okita et al. | 250/231.14 |
| 4,679,029 | 7/1987 | Krohn et al. | 250/231.13 |
| 4,751,383 | 6/1988 | Ueyama | 250/231.13 |
| 4,947,071 | 8/1990 | Clarke | 250/231.13 |
| 4,950,079 | 8/1990 | McMurtry et al. | 250/237 G |
| 4,952,799 | 8/1990 | Loewen | 250/231.16 |
| 4,987,299 | 1/1991 | Kobayashi et al. | 250/231.4 |
| 5,037,206 | 8/1991 | Etzkorn et al. | 250/231.14 |
| 5,059,901 | 10/1991 | Van Voorhis | 250/231.13 |

FOREIGN PATENT DOCUMENTS

| | | |
|---|---|---|
| 58-102110 | 12/1981 | Japan |
| 63-88075 | 6/1988 | Japan |
| 1321313 | 6/1988 | Japan |
| 2-10113 | 1/1990 | Japan |
| 2-188145 | 7/1990 | Japan |

Primary Examiner—David C. Nelms
Assistant Examiner—John R. Lee
Attorney, Agent, or Firm—Sughrue, Mion, Zinn, Macpeak & Seas

[57] ABSTRACT

In a position detecting method and an apparatus therefor, a signal processing circuit including a semiconductor laser, a light receiving element and the like is arranged on the outside of a servomotor. An article to be detected is arranged within the servomotor. The signal processing circuit and the article are connected to each other by a single or a plurality of optical fibers. A laser light is applied to surface properties formed inevitably at processing of a surface of the article, to produce a signal of a reflected light. The signal of the reflected light and a beforehand stored position signal of the article are compared with each other so as to be converted into a rotational-angle signal, thereby detecting a position of the article.

27 Claims, 19 Drawing Sheets

FIG. 12

ROM TABLE

| OUTPUT VOLTAGE FROM AMPLIFIER CIRCUIT (a) | OUTPUT FROM A/D CONVERTER CIRCUIT (Y) | OUTPUT FROM ROM (ROTATIONAL ANGLE) $\theta$ |
|---|---|---|
| $a_0 \leq a < a_1$ | $Y_1$ | $X_1$ |
| $a_1 \leq a < a_2$ | $Y_2$ | $X_2$ |
| $a_2 \leq a < a_3$ | $Y_3$ | $X_3$ |
| $a_3 \leq a < a_4$ | $Y_4$ | $X_4$ |
| $a_4 \leq a < a_5$ | $Y_5$ | $X_5$ |
| $a_5 \leq a < a_6$ | $Y_6$ | $X_6$ |
| $a_6 \leq a < a_7$ | $Y_7$ | $X_7$ |
| $a_7 \leq a < a_8$ | $Y_8$ | $X_8$ |
| ⋮ | ⋮ | ⋮ |
| $a_{2^n-1} \leq a < a_{2^n}$ | $Y_{2^n}$ | $X_{2^n}$ |

ONE REVOLUTION

METHOD AND APPARATUS USING LASER LIGHT FOR DETECTING THE ROTATIONAL POSITION OF A SERVOMOTOR AND THE LIKE

FIELD OF THE INVENTION

This invention relates to a position detecting method and an apparatus therefor for detecting a position of an article to be detected (hereinafter referred simply to as "article") which is arranged on a servomotor used in a machine tool or the like, thereby detecting a rotational speed and a rotational angle of the article.

BACKGROUND OF THE INVENTION

A servomotor having a high resolution encoder, which is used in a conventional machine tool or the like, is disclosed in Japanese Patent Laid-Open No. HEI 2-188145. FIG. 1 of the attached drawings is a longitudinal cross-sectional view showing a coupling mounting type in which a servomotor is fixedly mounted to the outside of a bracket by a coupling. In FIG. 1, a rotor 1 has a rotary shaft 2 to which a plurality of permanent magnets 3 are fixedly mounted. A stator 4 has a fixed iron core 5 about which a coil 6 is wound. The rotor 1 is supported by a first bracket 7 and a second bracket 8 by their respective first and second bearings 9 and 10.

In the example illustrated in FIG. 1, a detector 11 uses an optical encoder. An outer frame 12 is fixedly mounted to the second bracket 8. The reference numeral 13 denotes a cover. An encoder shaft 14 is rotatably supported by a pair of bearings 15 and 16. A detecting scale 17 is fixedly mounted to the encoder shaft 14. Generally, the detecting scale 17 is manufactured such that chrome is applied to a glass material, and slits of a requisite pattern are formed in the glass material by etching. A stationary scale 18 is formed similarly to the detecting scale 17. The stationary scale 18 is provided with a requisite pattern, and is fixed such that a gap of 30~50 µm is set between the stationary and detecting scales 18 and 17 in order to largely vary or change an output from the stationary scale 18 as compared with that from the detecting scale 17.

In the case where the encoder is an incremental type, the aforesaid patterns are arranged such that, in order to detect the rotational angle, the detecting scale 17 and the fixed scale 18 output two signals including sine and cosine having requisite resolution (the number of slits) and shifted in phase electrically by 90 degrees, a single signal of a rotational single pulse serving as a rotational-angle standard, and three~four signals for detecting a position of the permanent magnet 3. Further, in the case where the encoder is an absolute-value type, the aforementioned pattern is an absolute-value code (gray code or the like) having requisite resolution. However, an output is divided by an electrical interpolation to improve resolution.

The reference numeral 19 denotes a light emitting element, and an LED (light emitting diode) is generally used as the light emitting element. The reference numeral 20 designates a plurality of light receiving elements. The reference numeral 21 denotes a printed circuit board on which a signal processing circuit 22 is mounted. The reference numeral 23 denotes a flexible coupling; 24, a retainer or a presser plate for axially fixing the first bearing 9; and 25, a preload spring for applying axial pressure to the rotor 1.

FIG. 2 is a longitudinal cross-sectional view showing a conventional system in which a motor is directly mounted to the outside of the second bracket 8 and which does not use a coupling. In FIG. 2, the reference numerals identical with those used in FIG. 1 indicate the same or equivalent parts or elements. A boss 26 is fixedly mounted to the rotary shaft 2 by a nut 63. The detecting scale 17 is fixedly mounted to the boss 26. A mounting frame 27 is in the form of a reversed letter C, and the light emitting element 19 and the light receiving element 20 are fixedly mounted to the mounting frame 27. The mounting frame 27 is mounted to the printed circuit board 21 which is fixedly mounted to a cylindrical projection 8a on the second bracket 8.

FIG. 3 is a longitudinal cross-sectional view showing an encoder section of the conventional coupling mounting type. The encoder section utilizes an optical fiber and is disclosed in Japanese Patent Laid-Open No. HEI 2-10113. In FIG. 3, the reference numerals identical with those used in FIG. 1 indicate the same or equivalent parts or elements. Optical fibers 28 having their respective cores have their respective one ends 28a which face toward the light emitting element 9. The other ends 28b of the respective optical fibers 28 face toward the light receiving element 20 through the pattern of the detecting scale 17 and the pattern of the fixed scale 18.

FIG. 4 shows, of the conventional signal processing circuit 22, a section in which an output from the light receiving element 20 is divided by an electric interpolation to raise resolution. The reference numeral 20a denotes a light receiving element which outputs sine; 20b, a light receiving element which outputs cosine; 29a and 29b, amplifier circuits, respectively; 30a and 30b, A/D converters, respectively; and 31, a memory circuit which is formed by ROM (read-only memory). A conventional example of this kind is disclosed in Japanese Patent Laid-Open No. SHO 58-102110, Japanese Patent Laid-Open No. HEI 1-321313, and the like.

The above-described conventional example is directed to the servomotor including the encoder having high resolution. In the case where the servomotor is one which is low in resolution, there is a conventional example of type in which an encoder illustrated in FIG. 5 is incorporated in the servomotor. The conventional example is disclosed in Japanese Utility Model Laid-Open No. SHO 63-88075. In FIG. 5, parts or elements like or similar to those shown in FIG. 1 are designated by the same or like reference numerals. The detecting scale 17 in the form of a cylindrical metal cup which is fixedly mounted to the permanent magnet 3, has an outer periphery 17b of the cylindrical cup which is formed therein with slits 17c extending in the axial direction. Because of the low resolution, the stationary scale 18 is not required or can be dispensed with, and a gap equal to or more than 100 µm is defined between the detecting scale 17 and the light receiving element 20.

The operation will next be described. When the light emitting element 19 is turned on, a slit pattern of the detecting scale 17 is irradiated. In FIG. 3, a light is incident upon one of the ends 28a of the optical fibers 28, passes through the interiors of the respective optical fibers 28, and is emitted from the other ends 28b, to irradiate the slit pattern of the detecting scale 17. At this time, when the rotary shaft 2 rotates, the detecting scale 17 also rotates. Accordingly, the light from the light emitting element 19 repeats transmission/interception by the slits formed in the detecting scale 17. The transmitted light further passes through the fixed scale 18 to irradiate the light receiving element 20. The light receiving element 20 converts the requisite signal to an electrical signal in accordance with the slit pattern, and outputs the converted electrical signal.

At this time, since a sine wave signal is outputted from the light receiving element 20a and a cosine wave signal is outputted from the light receiving element 20b, detection of the rotational angle is amplified by the amplifier circuits 29a and 29b in the signal processing circuit 22, and is converted to digital values by the respective A/D converter circuits 30a and 30b with bits in which requisite resolution is obtained. The digital values are inputted to the memory circuit 31 as address signals.

Since rotational-angle information (which is fixed or constant rotational-angle information regardless of the mounted servomotor) corresponding to the address signals is stored beforehand in the memory circuit 31, the rotational-angle information corresponding to the address signals is outputted from the memory circuit 31. Accordingly, the outputs from the respective light receiving elements 20a and 20b are interpolated electrically so that the resolution can be improved.

Since the conventional servomotor of the coupling mounting type requires the coupling and the bearings, one problem is that an axial dimension or size is lengthened extremely.

Further, although the non-coupling type in which the motor is mounted directly to the outside of the second bracket 8, is slightly shortened as compared with the coupling mounting type, the problem of excessive length still remains. Also, since the gap between the detecting scale and the stationary scale must be reduced, a further problem in the non-coupling type is that the machining accuracy of the rotary shaft and the first and second brackets must be high.

Moreover, the detecting scale can be formed therein only with a finite number of slits, and utilizes an electrical interpolation in order to improve the resolution. Since, however, the rotational-angle information is not inputted in accordance with runout of the rotary shaft due to rotation of the servomotor, fluctuation in the relative relationship between the detecting scale and the stationary scale causes the output from the light receiving element to be varied so that interpolation accuracy is deteriorated, and an error occurs in the rotational-angle information. As a result, there is a limit in the resolution.

Further, since the encoder is mounted to the outside of the second bracket in the non-coupling type, in the case where the second bearing must be replaced with a new one on the basis of maintenance and inspection of the servomotor, the encoder section must be disassembled and dismounted. Thus, there is a further problem that, at assembling, the encoder section must be readjusted mechanically and electrically.

Furthermore, regarding the second bearing, since steps to prevent scattering of enclosed grease are not taken, the slits in the detecting scale may become contaminated.

Moreover, the type in which the encoder is incorporated therein has the following problem. That is, reliability of the rotational-angle information is reduced by the limited machining accuracy with which the rotary shaft of the servomotor and the first and second brackets are made, by the thermal expansion of the constitutional mechanical parts or elements of the detecting scale or the like due to heat generation of the servomotor, and by the limited heat resistance of the signal processing circuit. Thus, based on these problems, it is difficult to improve the resolution.

SUMMARY OF THE INVENTION

It is therefore an object of the invention to provide a position detecting method and an apparatus therefor in which it is possible to shorten an axial dimension or size, it is possible to improve resolution under such a condition that machining accuracy of constitutional parts or elements of, for example, a servomotor is maintained, and it is possible to easily practice maintenance and inspection of bearings for the servomotor, so that reliability of rotational-angle information is high.

To attain the above and other objects, according to the first embodiment of the invention, there is provided a position detecting method comprising the steps of applying a laser light to surface properties formed necessarily during machining of an article to be detected, receiving the laser light reflected from the surface properties, and comparing a signal of the received reflected light and a positional signal of the article stored beforehand with each other, to detect a position of the article on the basis of the comparison results.

With the arrangement of the first embodiment, the laser light is applied to the surface properties necessarily formed during the processing of the surface of the article to be detected. The laser light reflected from the surface properties is received. The signal of the received reflected light and the positional signal of the article stored beforehand are compared with each other. The position of the article is detected on the basis of the comparison results.

In the above-described first embodiment, since the surface properties necessarily formed during processing of the surface of the article are utilized to detect the position of the article, it is possible to improve resolution even under the condition that the machining accuracy of constitutional parts or elements of, for example, a servomotor, is not improved.

According to the second embodiment of the present invention, there is provided a position detecting apparatus comprising:

an article to be detected having surface properties formed during machining thereof;

applying means for applying a laser light to the surface properties of the article;

light receiving means receiving the laser light reflected from the surface properties; and comparator means for comparing a signal of the reflected light received by the light receiving means and a previously stored position signal of the article, wherein a position of the article is detected on the basis of comparative results due to the comparator means.

With the above arrangement of the second embodiment, the laser light is applied to the surface properties formed on the article. The light reflected from the surface properties is compared with the previously stored position signal of the article. The position of the article is detected on the basis of results of the comparison.

In the second embodiment, the laser light is applied to the surface properties formed on the article, the reflected light is compared with the previously stored position signal of the article, and a detection of the position of the article is obtained on the basis of the comparison results. Accordingly, it is possible to improve resolution even under the condition that the machining accuracy of the constitutional parts or elements of the servomotor is not improved.

According to the third embodiment of the present invention, there is provided a position detecting apparatus comprising:

a rotor having a rotary shaft;

a stator having a coil and a stationary iron core, the coil being wound about the stationary iron core;

a pair of first and second bearings for the rotary shaft;

a pair of first and second brackets for supporting the rotor with respect to the stator through the respective first and second bearings;

an article to be detected having surface properties and fixedly mounted to a predetermined portion of the rotary shaft;

a detecting unit which is mounted to an outer surface of the second bracket;

emitted-light optical fiber means and reflected-light optical fiber means having one of their respective ends arranged in facing relation to the article, the emitted-light and reflected-light optical fiber means extending through the second bracket, the other ends of the respective emitted-light and reflected-light optical fiber means being arranged on the outer surface of the second bracket;

a semiconductor laser arranged in facing relation to the other end of the emitted-light optical fiber means;

laser-light receiving means arranged in facing relation to the other end of the reflected-light optical fiber means, for receiving a laser light reflected from the article; and signal processing means for converting an output from the laser-light receiving means into an information signal.

With the above arrangement of the third embodiment of the invention, since an encoder is arranged between the second bracket and the stator in, for example, a servomotor, an axial dimension or size is shortened. Further, the semiconductor laser, the laser-light receiving element and the signal processing means are mounted to the outside of the servomotor, and are connected to the article through the emitted-light and reflected-light optical fiber means. Accordingly, a temperature rise of the detecting unit is low, and reliability of a service life with respect to heat is high. Furthermore, the light from the semiconductor laser is reflected by the surface of the article, and the intensity of the reflected light is generated on the basis of the irregular condition of the surface. Since the intensity of the reflection varies depending upon the surface properties of the article, the intensity is converted into an absolute rotational angle by the signal processing means. Moreover, scattering of the light is less because of utilization of the semiconductor laser. As a result, the gap between the emitted-light and reflected-light optical fiber means and the article is large. Thus, the machining accuracy of the servomotor can be retained similarly to the conventional apparatus.

In the third embodiment, the article is mounted to the interior of the servomotor, the detecting unit is provided and is fixedly mounted to the second bracket of the servomotor, and the article and the detecting unit are connected to each other through the emitted-light and reflected-light optical fiber means. Thus, it is possible to shorten the axial dimension or size. Further, since the semiconductor laser is used so that the surface properties of the article can be detected, it is possible to raise the resolution. Furthermore, since a semiconductor laser having a coherent characteristic is employed, the light tends not to be scattered, a stationary scale can be dispensed with, and the gap between the emitted-light and reflected-light optical fiber means and the article can increase. Thus, the machining accuracy of the rotary shaft and the first and second brackets of the servomotor can be maintained or retained similarly to the conventional apparatus.

According to a fourth embodiment, there is provided a position detecting apparatus including single optical fiber means used both as the emitted-light and reflected-light optical fiber means, and a beam splitter arranged between the semiconductor laser and one end of the single optical fiber means, wherein the laser-light receiving means is arranged on an optical axis of a branching reflected light from the beam splitter.

With the above arrangement of the fourth embodiment, the beam splitter divides the returned reflected light to irradiate the light-receiving means. Thus, the emitted-light and reflected-light optical fiber means can be formed by a single optical fiber means.

In the fourth embodiment, since the optical fiber means is a single fiber, parts or elements can be reduced in number, and the cost can be reduced. Accordingly, an adjustment of the relative relationship between the one ends of the respective emitted-light and reflected-light optical fiber means is not necessary.

According to a fifth embodiment of the present invention, there is provided a position detecting apparatus including cylindrical lens means arranged between the one ends of the respective emitted-light and reflected-light optical fiber means and the article.

With the above arrangement of the fifth embodiment, the cylindrical lens means enlarges or widens the light emitted from the emitted-light and reflected-light optical fiber means into the form of a straight line. Thus, the amount of rotational-angle information of the article is increased, to raise reliability of the information.

In the fifth embodiment, since the cylindrical lens means is arranged between the emitted-light and reflected-light optical fiber means and the article, the rotational-angle information is inputted all at once. Thus, reliability can be improved.

According to the sixth embodiment of the present invention, there is provided a position detecting apparatus wherein the emitted-light and reflected-light optical fiber means have their respective cores at one end which are arranged perpendicularly with respect to a rotational direction of the article, or an orientation focusing toward the article.

With the above arrangement of the sixth embodiment, since the multi-core emitted-light and reflected-light optical fiber means are arranged perpendicularly to the rotational direction of the article, a substantial amount of information concerning the article at a certain angle is received, to raise reliability of the information.

In the sixth embodiment, since the emitted-light and reflected-light optical fiber means have their respective cores, much rotational-angle information is inputted at once. Thus, reliability can further be improved.

According to the seventh embodiment of the invention, there is provided a position detecting apparatus including a thermal insulating plate means arranged between the detecting unit and the second bracket, and thermal insulator means with which the emitted-light and reflected-light optical fiber means are covered, wherein the thermal insulator means and the thermal insulating plate means are molded integrally with each other.

With the above arrangement of the seventh embodiment, the thermal insulating plate means cuts off or isolates heat generated by, for example, a servomotor and transmitted to the second bracket, with respect to the detecting unit. Further, the thermal insulator means isolates the heat generated by the servomotor and transmitted to air within the servomotor with respect to the emitted-light and reflected-light optical fiber means made of a plastic material. The thermal insulator means is formed in integral relation to the thermal insulating plate means. Thus, handling is made easy.

In the seventh embodiment, the arrangement is such that the thermal insulating plate means is arranged between the detecting unit and the second bracket, the emitted-light and reflected-light optical fiber means are covered with the thermal insulator means, and the thermal insulator means is formed integrally with the thermal insulating plate means. With the arrangement, a temperature rise of the semiconductor laser is restrained so that the service life of the semiconductor laser can be prolonged. Further, use of the emitted-light and reflected-light optical fiber means made of a plastic material is made possible so that the apparatus is reduced in cost. As a result of the fact that the thermal insulator means and the thermal insulating plate means are integrally molded, handling is made easy.

According to the eighth embodiment of the present invention, there is provided a position detecting apparatus wherein the article has a surface toward which the one ends of the respective emitted-light and reflected-light optical fiber means face, the surface of the article being subjected to rust preventive treatment.

With the above arrangement of the eighth embodiment, the rust preventive treatment of the article prevents the article from being deteriorated or degraded, in a manner that would reduce the intensity of the reflection.

In the eighth embodiment, since the surface of the article, toward which the one ends of the emitted-light and reflected-light optical fiber means face, is subjected to the rust preventive treatment by gold plating or the like, a difference in strength of reflection is made large. Furthermore, degradation or deterioration of the surface of the article is restrained. Thus, reliability of the signal over a long period of time can be improved.

According to the ninth embodiment of the invention, there is provided a position detecting apparatus wherein the signal processing means includes memory means which stores therein actual rotational-angle information of, for example, a servomotor after completion of assembly.

With the above arrangement of the ninth embodiment, the memory circuit stores therein the rotational-angle information at the time the servomotor after completion of assembly is actually rotated, and outputs the rotational-angle information.

In the ninth embodiment, the memory circuit stores therein the rotational-angle information at the time the servomotor after completion of assembly is rotated in practice. Accordingly, fluctuation of the output from the light receiving means is small even if the relative relationship between the emitted-light and reflected-light optical fiber means and the article is fluctuated. Thus, interpolation accuracy can be improved.

According to the tenth embodiment of the invention, the position detecting apparatus comprises the memory means which includes a plurality of first memory means and second memory means having an input that is outputs from the first memory means.

With the above arrangement of the tenth embodiment, much of the rotational-angle information of the article is taken, is amplified by an amplifier circuit, and is converted into a digital value by an A/D converter. The converted digital value is inputted to addresses of the plurality of first memory means. The first memory means outputs a plurality of rotational-angle information. On the basis of the outputs from the respective first memory means, the second memory means outputs the more accurate rotational-angle information which is smoothed or equalized, on the basis of the output from the first memory means.

In the tenth embodiment of the invention, there are obtained a plurality of rotational-angle information, and the rotational-angle information is means. Thus, the reliability of the rotational-angle information can be improved.

According to the eleventh embodiment, there is provided a position detecting apparatus wherein the memory means is so formed as to be writable.

With the above arrangement of the eleventh embodiment, the rewritable memory (EEPROM) can rewrite the rotational-angle information when, for example, a servomotor is disassembled or decomposed by replacement of the second bearing or the like.

In the eleventh embodiment, since the memory means is formed as being rewritable, only rewriting of the rotational-angle information is sufficient even if the servomotor is disassembled by replacement of the second bearing or the like. Thus, mechanical and electrical adjustment can be dispensed with so that maintenance can be made easy.

According to the twelfth embodiment, there is provided a position detecting apparatus including temperature compensating means in addition to the signal processing means, wherein the stator includes a temperature detecting element, and wherein a temperature information signal inputted into the temperature compensating means is a signal from the temperature detecting element of the stator.

With the above arrangement of the twelfth embodiment, the temperature compensating means compensates temperature of the output from the light receiving means by the signal from the temperature detecting element of the servomotor.

In the twelfth embodiment, since the temperature compensating means is incorporated in the apparatus, it is possible to use the apparatus even if fluctuation in temperature is large. Furthermore, since data from the temperature detecting element of the servomotor is diverted, it is possible to reduce the cost of the apparatus.

According to the thirteenth embodiment, there is provided a position detecting apparatus including a Peltier-effect element, wherein the semiconductor laser is cooled by the Peltier-effect element.

With the above arrangement of the thirteenth embodiment, the Peltier-effect element cools the semiconductor laser. Thus, it is possible to raise reliability of the temperature service life of the semiconductor laser.

In the thirteenth embodiment, since the semiconductor laser is cooled by the Peltier-effect element, a temperature rise of the semiconductor laser can be restrained and, further, the temperature service life of the semiconductor laser can be prolonged.

According to the fourteenth embodiment, there is provided a position detecting apparatus wherein each of the stator and the rotor of a servomotor is molded by resin.

With the above arrangement of the fourteenth embodiment, the stator and the rotor, each of which is molded by the resin, facilitate cleaning and prevent dust from being generated. Further, the resin-type stator and rotor facilitate discharge of generated-heat, for example, from a servomotor to the outside.

In the fourteenth embodiment, since the stator and the rotor within the servomotor are molded by their respective resins, cleaning of the stator and the rotor is made easy, and no dust is generated. Thus, contamination of the surface of the article is minimized. Furthermore, the temperature due to heat generation of the servomotor is liable to be discharged to the outside, reliability can be improved with respect to the signal processing means within the detecting unit and the emitted-light and reflected-light optical fiber means. Moreover, it is possible to restrain an influence upon the output due to thermal expansion of constitutional mechanical parts or elements such as the article and the like.

According to the fifteenth embodiment, there is provided a position detecting apparatus including partition plate means arranged between the article and the stator and fixedly mounted to the second bracket, wherein a small gap is defined between the partition plate means and the rotor.

With the above arrangement of the fifteenth embodiment, the partition plate means prevents dust from traveling between the stator and the rotor and isolates heat generated by the stator.

In the fifteenth embodiment, the arrangement is such that the partition plate means is arranged between the article and the stator and is fixed, and the small gap is defined between the partition plate means and the rotor. With the arrangement, the dust generated from the stator and the rotor is prevented from adhering to the article to contaminate the same. Thus, reliability of the rotational-angle information can be improved.

According to the sixteenth embodiment, there is provided a position detecting apparatus including presser plate means, the second bearing fitted in the second bracket being fixedly mounted to the second bracket in a rotational-axis direction by the presser plate means, and slinger means arranged between the second bearing and a shoulder of the rotary shaft, wherein a small gap is defined between an outer periphery of the slinger means and an inner periphery of the presser plate means to form an oil accumulating groove in the presser plate means.

With the above arrangement of the sixteenth embodiment, the presser plate means and the slinger means prevent grease from flying out from the second bearing and adhering to the article. Furthermore, since a thermal expansion standard of the rotary shaft serves as the second bearing, axial shift in position between the article and the emitted-light and reflected-light optical fiber is reduced.

In the sixteenth embodiment, since scattering and adhering of the grease to the article from the second bearing are prevented by the presser plate means and the slinger means, reliability of the rotational-angle information can be improved. Further, since the presser plate means fixes the second bearing, movement of the article due to the thermal expansion of the rotary shaft is reduced so that reliability of the rotational-angle information can be improved.

According to the seventeenth embodiment, there is provided a position detecting apparatus wherein the second bracket is formed therein with an inspecting window, the inspecting window being located at a position where a gap is defined between the article and the one ends of the respective emitted-light and reflected-light optical fiber means.

With the above arrangement of the seventeenth embodiment, the inspecting window can inspect the gap between the emitted-light and reflected-light optical fiber means and the article.

In the seventeenth embodiment, since the inspection window is provided on the second bracket, inspection of the gap between the emitted-light and reflected-light optical fiber means and the article can be made easy.

According to the eighteenth embodiment, there is provided a position detecting apparatus wherein the detecting unit is mounted separately from, for example, a servomotor.

With the above arrangement of the eighteenth embodiment, the detecting unit can be arranged at a location separate from the servomotor.

In the eighteenth embodiment, the arrangement is such that the emitted-light and reflected-light optical fiber means are extended, and the detecting unit is located in spaced relation to the servomotor. With the arrangement, the detecting unit can be arranged at a location low in temperature. Thus, reliability with respect to temperature can be improved. Furthermore, it is possible to reduce a dimension or size of the servomotor in a direction perpendicular to the rotary shaft.

According to the nineteenth embodiment, there is provided a position detecting apparatus wherein one of the emitted-light and reflected-light optical fiber means and the single optical fiber means is divided into a plurality of sets which face toward the article from a plurality of directions.

With the above arrangement of the nineteenth embodiment, the emitted-light and reflected-light optical fiber means or the single optical fiber means divided in various directions detect the surface properties of the article in various directions.

In the nineteenth embodiment, the arrangement is such that the emitted-light and reflected-light fiber means or the single optical fiber means used both as the emitted-light and reflected-light fiber means are/is divided into a plurality of sets, and the plurality of sets face toward the article from the plurality of directions. With the arrangement, reliability of the rotational-angle information can be improved even if the rotor is vibrated.

According to the twentieth embodiment, there is provided a position detecting apparatus including a plurality of screws by which the detecting unit is fixedly mounted to the second bracket, wherein the thermal insulating plate means serves also as an electrical insulator, and wherein the screws are formed by an electrical insulator.

With the above arrangement of the twentieth embodiment, since the screws, by which the thermal insulating plate means and the detecting unit are fixedly mounted to the second bracket, are made of the electrical insulator, the detecting unit and a servomotor, for example, can electrically be insulated from each other.

In the twentieth embodiment, the arrangement is such that the thermal insulating plate means is formed by the electric insulator, and the screws used to fixedly mount the detecting unit to the second bracket are formed by the electric insulator. With the arrangement, a bad influence of noise with respect to the signal processing means is excluded or removed. Thus, reliability of the rotational-angle information can be improved.

According to a twenty-first embodiment of the invention, there is provided a position detecting apparatus comprising:

a rotor having a rotary shaft;

a stator having a coil and a stationary iron core, the coil being wound about the stationary iron core;

a pair of first and second bearings for the rotary shaft;

a pair of first and second brackets for supporting the rotor with respect to the stator through the respective first and second bearings which are mounted respectively to the first and second brackets;

an article to be detected having surface properties formed inevitably upon surface processing;

a detecting unit which is mounted to an outer surface of the second bracket;

emitted-light optical fiber means and reflected-light optical fiber means having one of their respective ends arranged in facing relation to the article, the emitted-light and reflected-light optical fiber means extending through the second bracket, the other ends of the respective emitted-light and reflected-light optical fiber means being arranged on the outer surface of the second bracket;

a semiconductor laser arranged in facing relation to the other end of the emitted-light optical fiber means;

laser-light receiving means arranged in facing relation to the other end of the reflected-light optical fiber means, for receiving a laser light reflected from the article; and signal processing means for converting an output from the laser-light receiving means into an information signal, wherein the rotor is used as the article.

With the arrangement of the twenty-first embodiment of the invention, since the outer periphery of the rotary shaft forms the article, it is possible to reduce the number of parts or elements.

According to the twenty-first embodiment, since the outer periphery of the rotary shaft forms the article, it is possible to reduce the cost of the apparatus.

Other objects and features of this invention will become understood from the following description with reference to the accompanying drawings.

BRIEF DESCRIPTION OF THE DRAWINGS

The invention will be described in more detail in conjunction with the following drawings, wherein:

FIG. 12 is a view for explanation of a condition of a ROM table in a memory circuit in which information of the relationship illustrated in FIG. 11 is stored;

DESCRIPTION OF THE PREFERRED EMBODIMENTS

Figure 1:
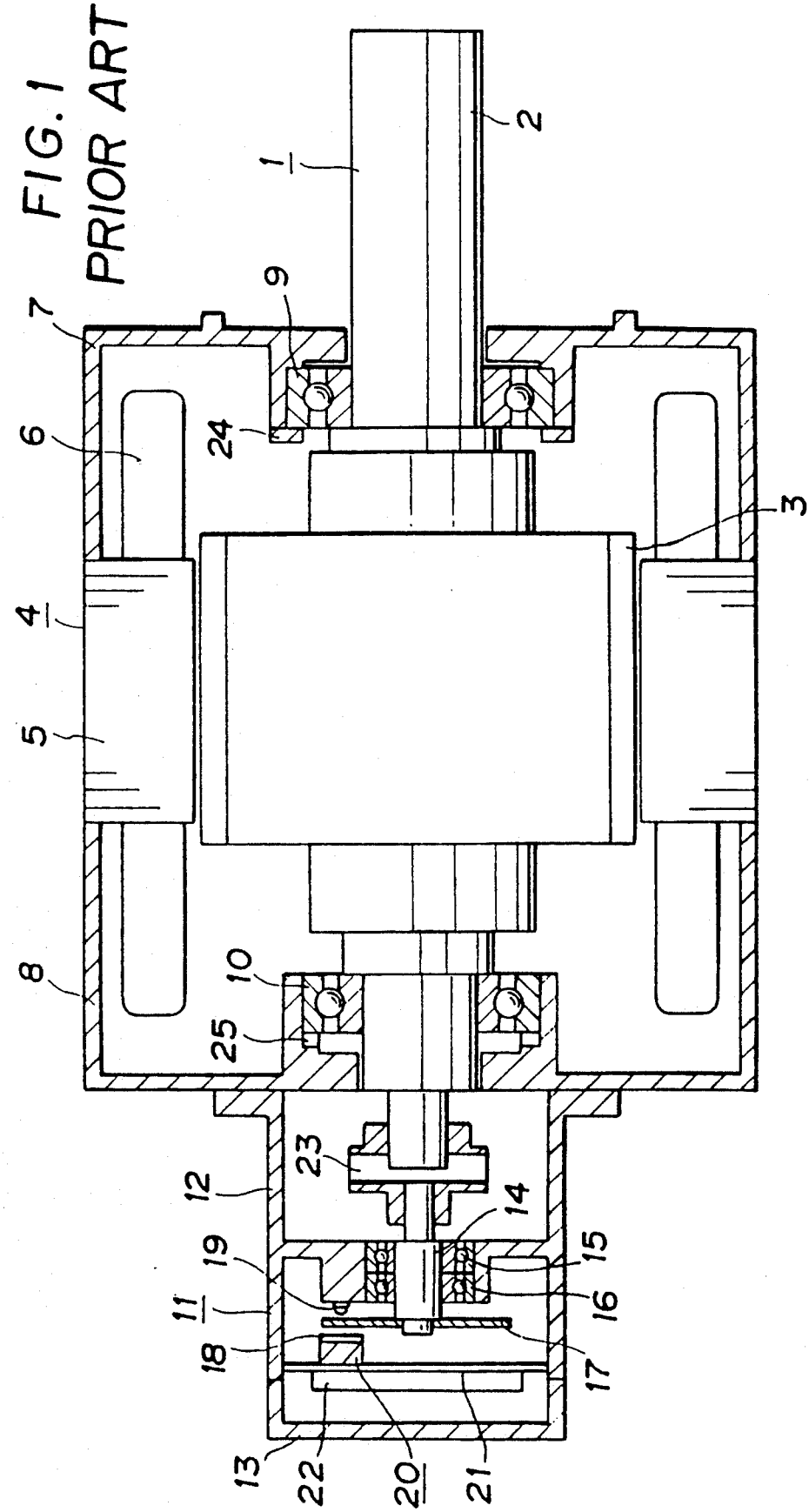
FIG. 1 is a longitudinal cross-sectional view showing an arrangement of a conventional servomotor of coupling mounting type.
Figure 2:
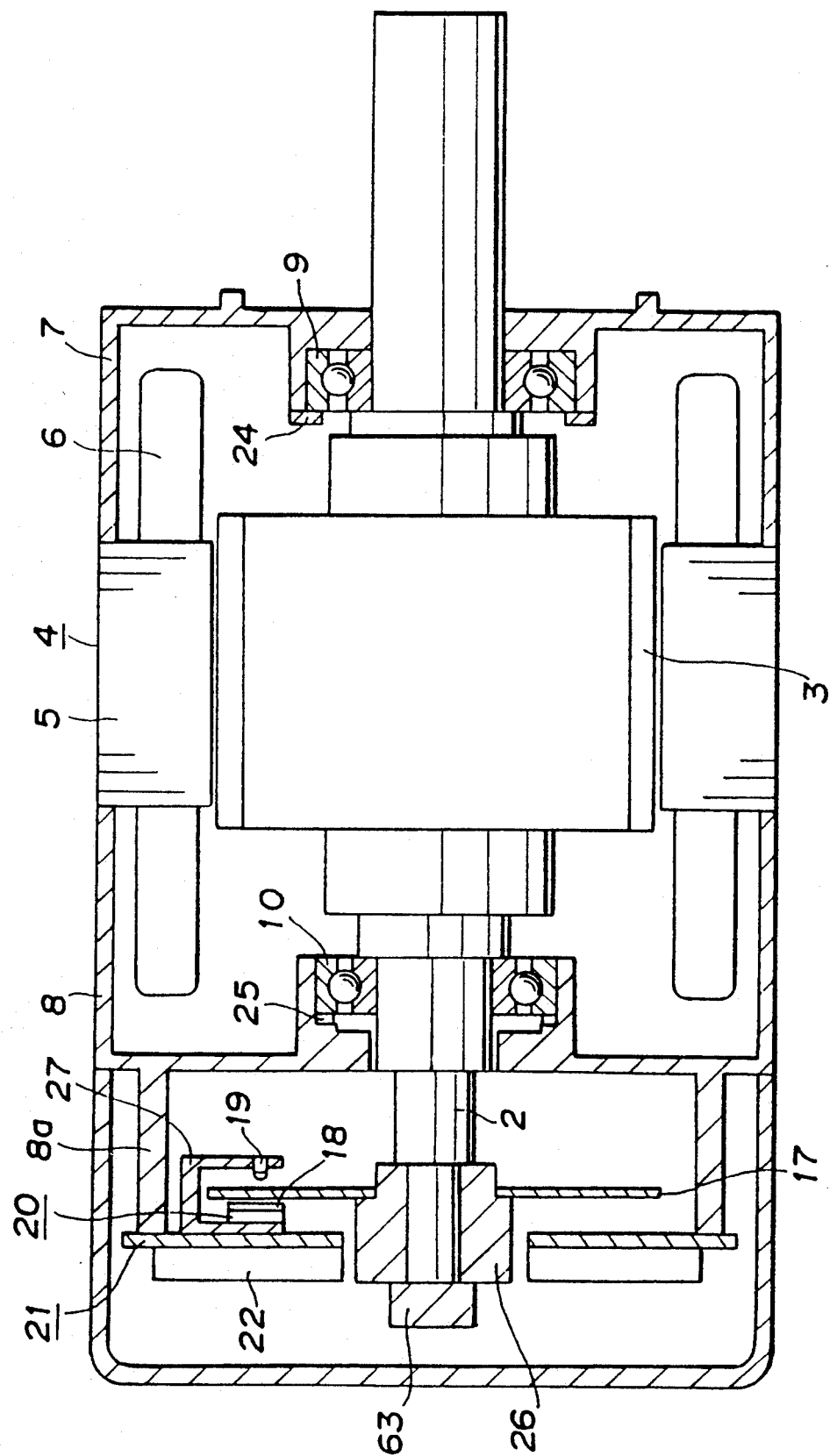
FIG. 2 is a longitudinal cross-sectional view showing an arrangement of a conventional servomotor of type in which a motor is directly mounted to the outside.
Figure 3:
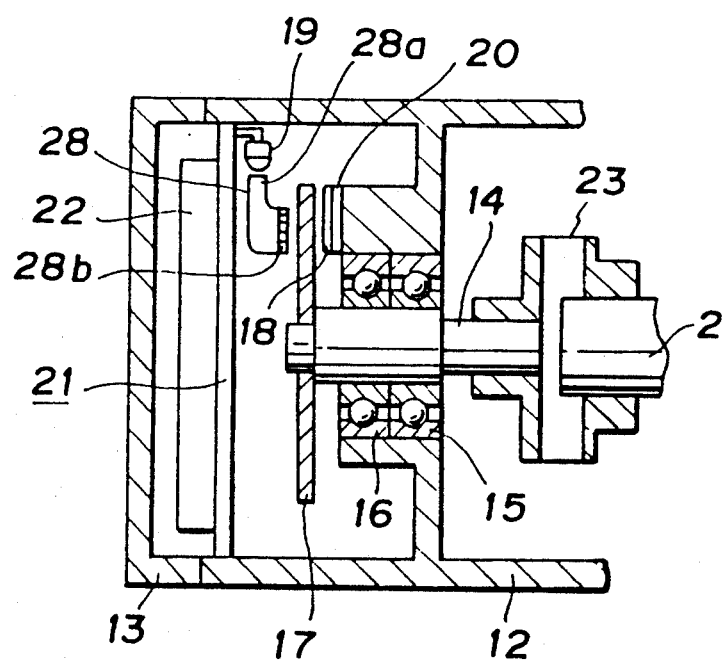
FIG. 3 is a longitudinal cross-sectional view showing a conventional encoder which uses a plurality of optical fibers.
Figure 4:
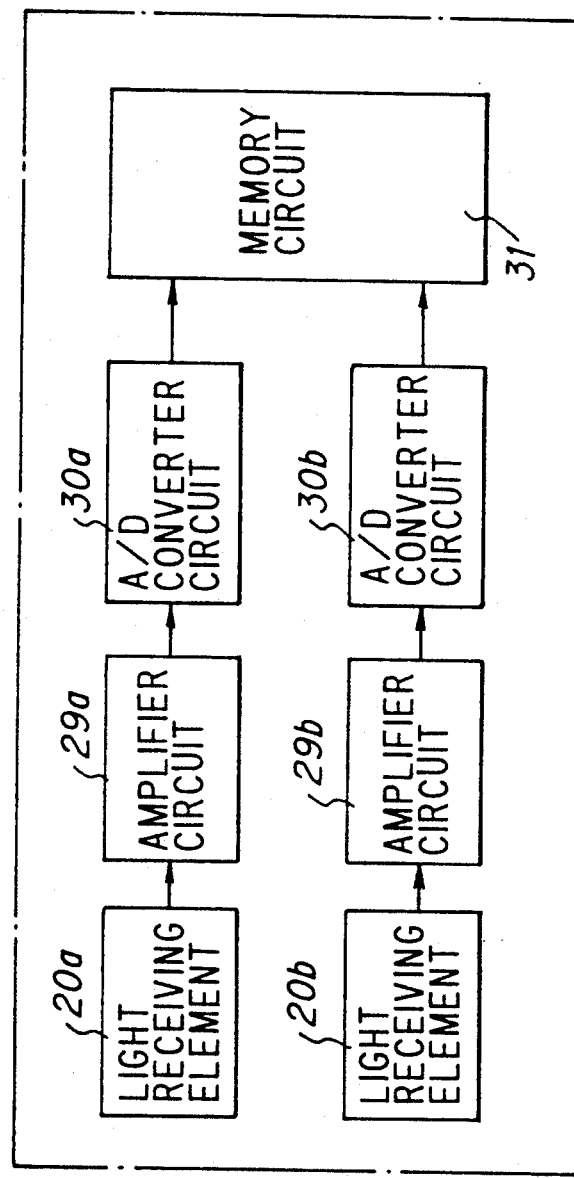
FIG. 4 is a block diagram showing a conventional signal processing circuit.
Figure 5:
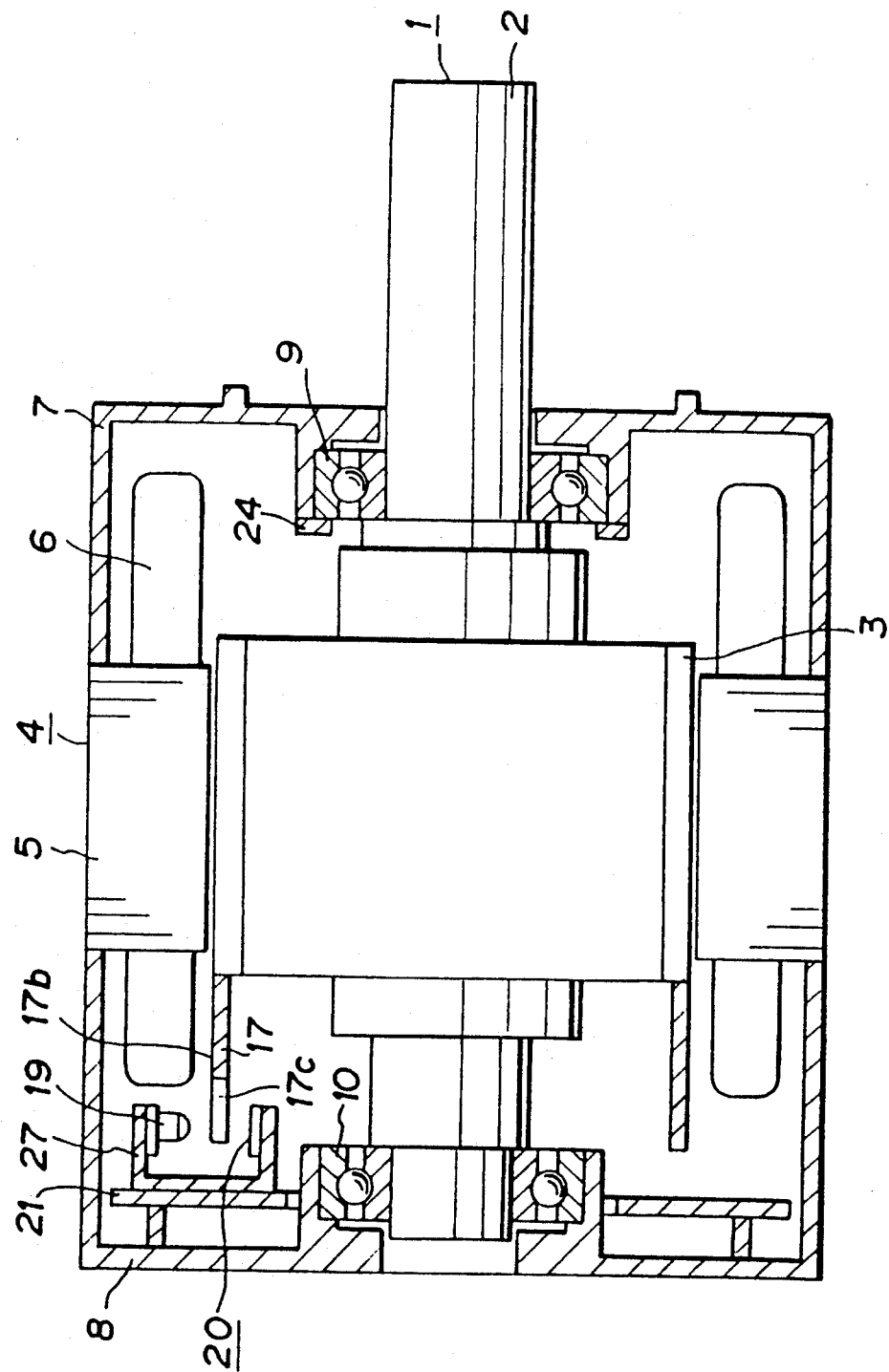
FIG. 5 is a longitudinal cross-sectional view showing a servomotor of type in which an encoder is incorporated therein.
Figure 6:
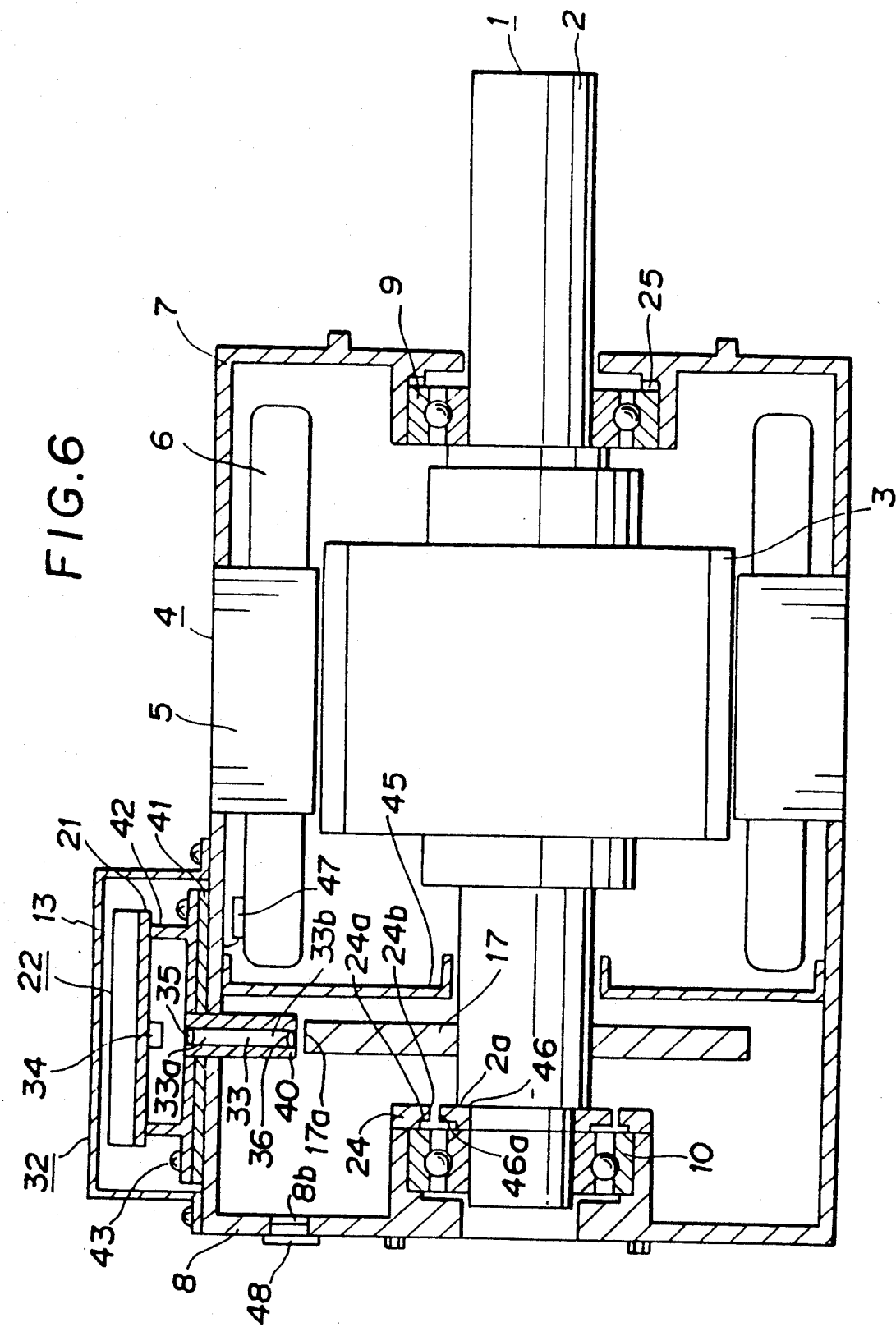
FIG. 6 is a longitudinal cross-sectional view showing an arrangement of a servomotor according to an embodiment of the invention.
Figure 7:
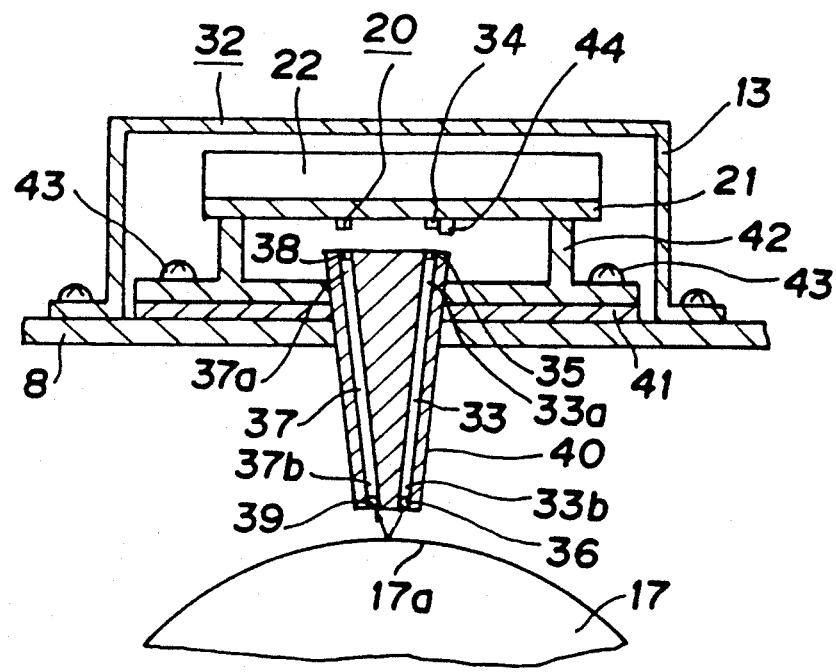
FIG. 7 is a fragmentary lateral cross-sectional view showing an arrangement of an encoder section according to an embodiment of the invention.
Figure 8:
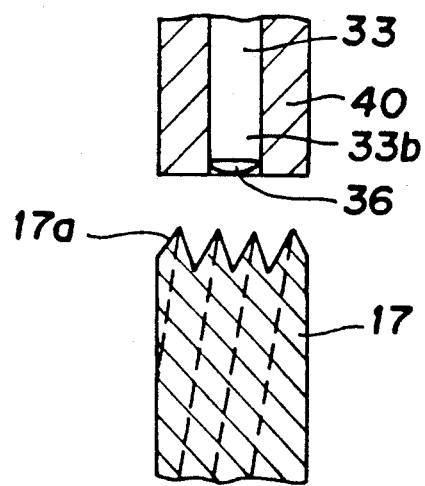
FIG. 8 is a fragmentary longitudinal cross-sectional view showing an arrangement of an article to be detected according to an embodiment of the invention.

Referring first to FIGS. 6 through 8, there is shown a position detecting method and an apparatus therefor according to an embodiment of the invention. Specifically, FIG. 6 is a longitudinal cross-sectional view of an embodiment of the invention, FIG. 7 is a fragmentary lateral cross-sectional view showing an encoder section, and FIG. 8 is a fragmentary longitudinal cross-sectional view of an article to be detected. In the figures, the reference numerals 1 through 10 denote parts or elements identical with or equivalent to those of the aforementioned conventional position detecting apparatus in which the encoder is incorporated in the servomotor. Further, in the figures, the reference numeral 32 designates a detecting unit.

An emitted-light optical fiber 33 has one end 33a thereof which faces toward a semiconductor laser 34 through a convex lens 35. The other end 33b of the optical fiber 33 faces toward an article to be detected 17 through a convex lens 36. The article 17 has a surface 17a whose properties have an unspecific pattern of cutting stripes. In this connection, it is considered that the surface properties in the surface 17a of the article 17 are those formed by wire cutting, those formed by a chemical generation method, or the like. However, the invention should not be limited to those forming methods.

A reflected-light optical fiber 37 has one end 37a thereof which faces toward a light-receiving element 20 through a convex lens 38. The other end 37b of the optical fiber 37 faces toward the article 17 through a convex lens 39.

A holder 40 holds the emitted-light optical fiber 33, the reflected-light optical fiber 37, and the convex lenses 35, 36, 38 and 39. A gap between the convex lenses 36 and 39 and the article 17 is set large. A heat insulating plate 41 is arranged between the detecting unit 32 and the second bracket 8. A mounting table 42, to which a printed circuit board 21 is mounted, is fixedly mounted to the second bracket 8 by means of fixing screws 43 which are made of an electric insulator. The holder 40 is fixedly mounted to the mounting table 42.

A Peltier-effect element 44 is mounted to the printed circuit board 21 at a location in the vicinity of the semiconductor laser 34. A partition plate 45 is arranged between the stator 4 and the article 17 and is fixedly mounted to the second bracket 8 with a small gap left between the rotary shaft 2 and an inner periphery of the partition plate 45. A retainer or a presser plate 24 is formed therein with an oil accumulating groove 24a. A slinger 46 is arranged between the second bearing 10 and a shoulder 2a of the rotary shaft 2. A small gap is defined between an inner periphery 24b of the presser plate 24 and an outer periphery 46a of the slinger 46. Further, the presser plate 24 serves to fix the second bearing 10 in a direction along a rotating axis of the rotary shaft 2.

Although not shown, a temperature detecting element 47 is set to a signal processing circuit 22 of the detecting unit 32. An inspection window 8b is formed in the second bracket 8 for inspecting the gap between the convex lenses 36 and 39 and the surface 17a of the article 17. A cap 48 is fitted in the inspecting window 8b.

Figure 9:
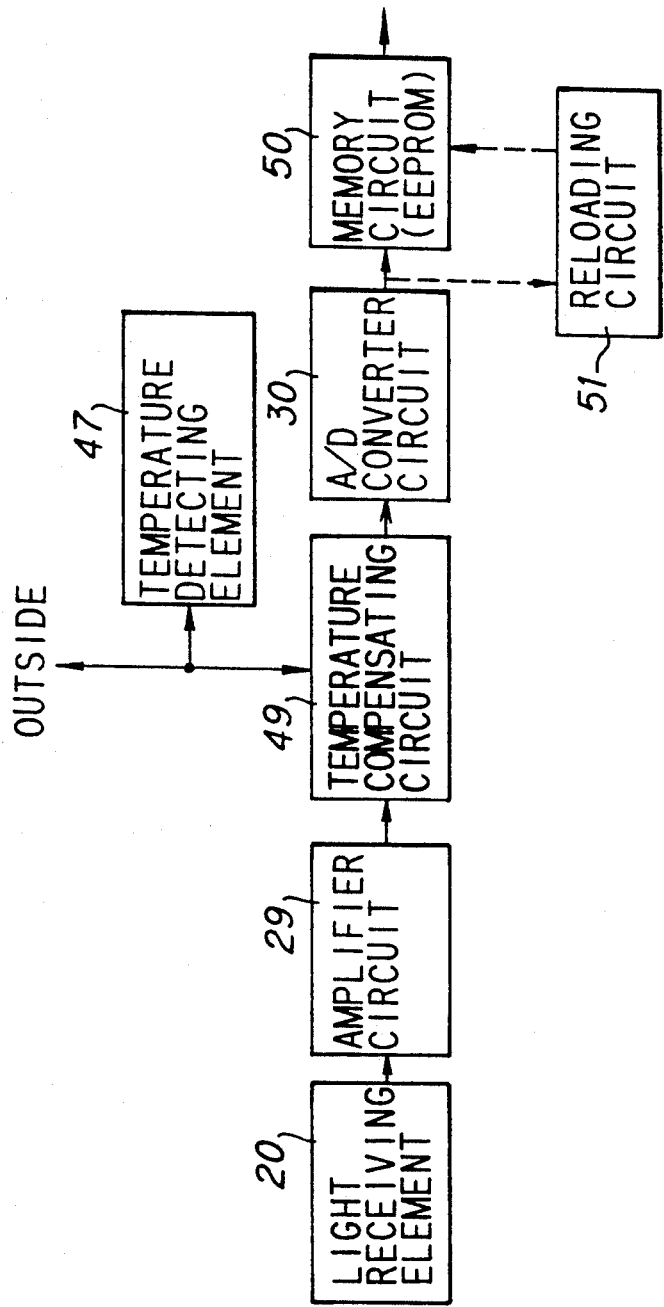
FIG. 9 is a block diagram showing an arrangement of a signal processing circuit according to an embodiment of the invention.
Figure 10:
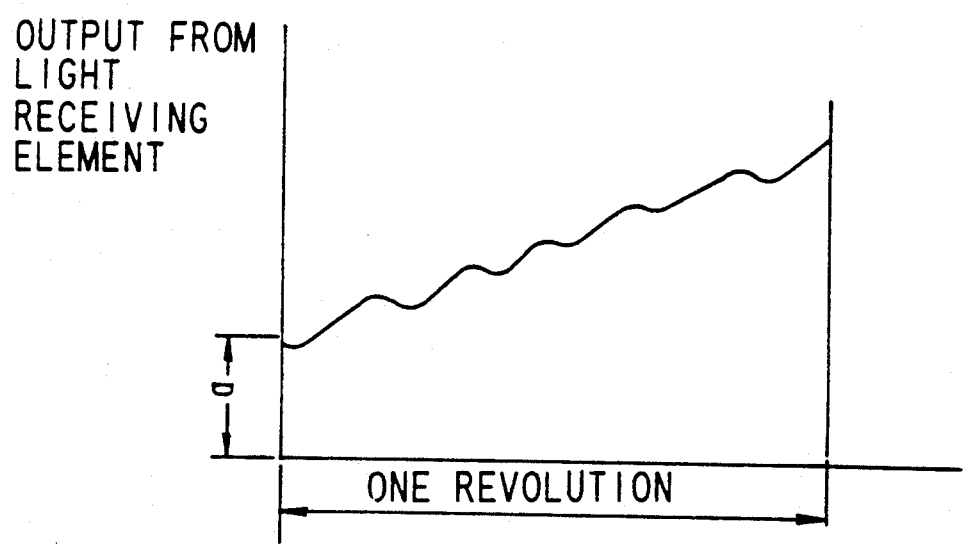
FIG. 10 is a graphical representation of an output from a light receiving element according to an embodiment of the invention.

FIG. 9 is a block diagram of the signal processing circuit 22, showing the embodiment of the invention. FIG. 10 is a graphical representation showing an output from the light receiving element 20 at the time the servomotor makes one revolution. In FIG. 9, the reference numeral 20 denotes a light receiving element; 29, an amplifier circuit; 30, an A/D (analog-digital) converter circuit; 47, a temperature detecting element; 49, a temperature compensating circuit; 50, a memory circuit comprising a reloadable EEPROM (electrically erasable programmable read only memory); and 51, a reloading circuit for the memory circuit 50.

The operation of the position detecting apparatus according to the embodiment of the invention will next be described.

In the encoder-incorporated servomotor constructed as described above, when the semiconductor laser 34 is turned on, a laser light is condensed by the convex lens 35, is incident upon the one end 33a of the emitted-light optical fiber 33, is emitted from the other end 33b of the emitted-light optical fiber 33, and is condensed by the convex lens 36 to irradiate the surface 17a of the article 17. At this time, since the light from the semiconductor laser 34 has a coherent characteristic, there is no difficulty if the gap between the convex lenses 36 and 39 and the article 17 is large.

The light reflected by the surface 17a article 17 and returned through the reflected-light optical fiber 37 is condensed by the convex lens 38 to irradiate the light receiving element 20. At this time, when the rotary shaft 2 rotates, the article 17 also rotates. Since, however, the cutting stripes are formed on the surface 17a of the article 17, the gap between the convex lenses 36 and 39 and the surface 17a changes, and a quantity of light reflected and returned to the light receiving element 20 also changes so that the output from the light receiving element 20 changes by one revolution as illustrated in FIG. 10.

The change in the output from the light receiving element 20 is amplified by the amplifier circuit 29, and a rate of change a shown in FIG. 10 is controlled constant by the temperature compensating circuit 49 on the basis of information from the temperature detecting element 47. Subsequently, an output from the temperature compensating circuit 49 is converted to a digital value by the A/D converter circuit 30 with a number of bits such that there is produced a requisite resolution. The digital value outputted from the A/D converter circuit 30 is outputted, as an address signal, to the memory circuit 50 which is formed by EEPROM.

Figure 11:
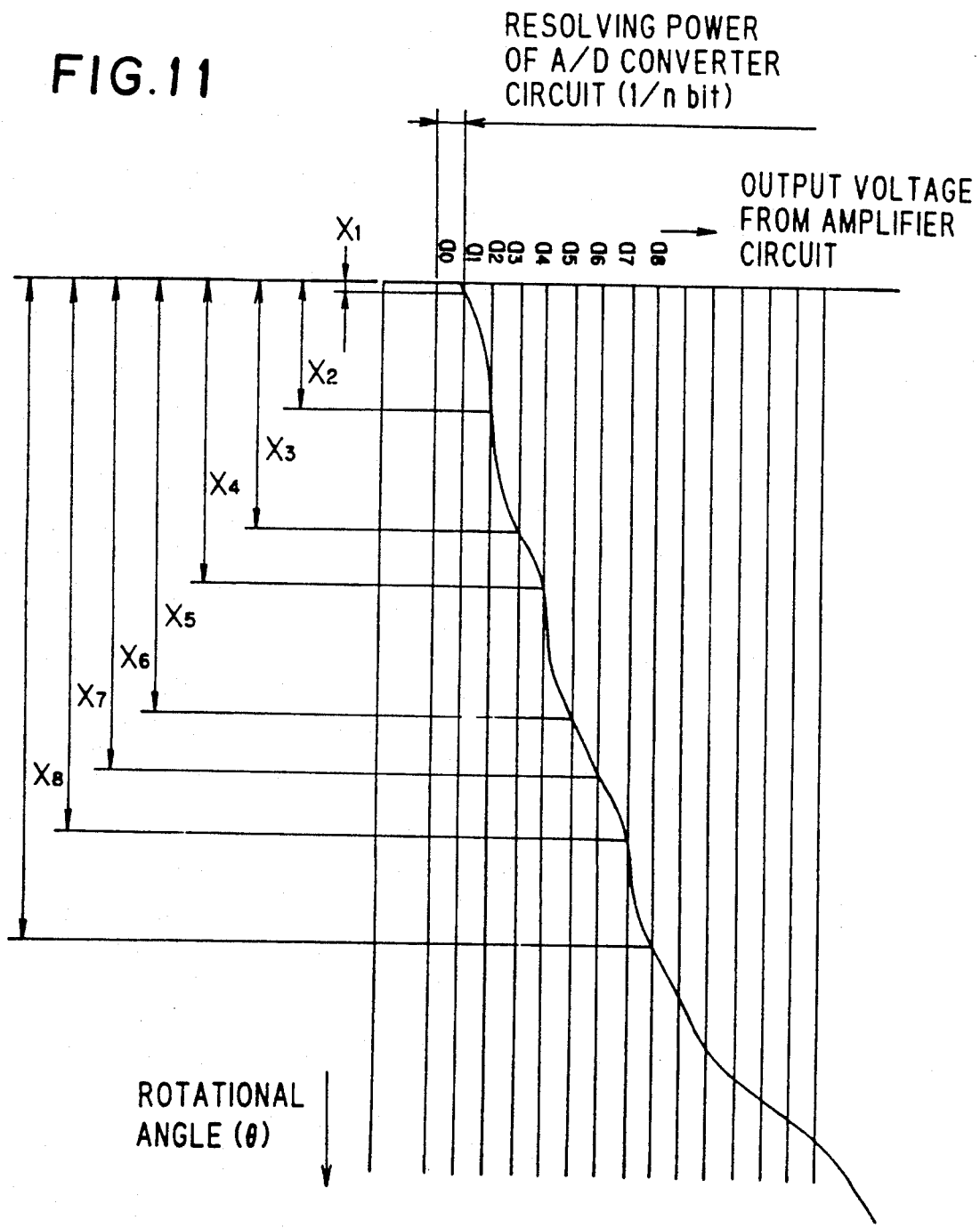
FIG. 11 is a graphical representation of voltage outputted from an amplifier circuit and rotational angle of a rotary shaft, according to an embodiment of the invention.

At this time, the servomotor is beforehand driven by an external device (not shown), the output from the A/D converter circuit 30 is fetched, and a relationship between the output from the A/D converter circuit 30 and the rotational angle of the rotary shaft 2 is inputted to the memory circuit 50 by the reloading circuit 51 of the memory circuit 50. Accordingly, rotational-angle information is outputted from the memory circuit 50 by the address signal from the A/D converter circuit 30. FIG. 11 is a graphical representation showing a relationship (as an example) between the voltage outputted from the amplifier circuit 29 and the rotational angle of the rotary shaft 2 in the servomotor. FIG. 12 is a view for explanation of a ROM table when the contents illustrated in FIG. 11 are stored in the memory circuit 50. In FIGS. 11 and 12, the reference symbol a denotes an output voltage from the amplifier circuit, the reference symbol X denotes an output from ROM, and the reference symbol Y denotes an output from the A/D converter circuit.

Referring again to FIG. 6, since the semiconductor laser 34 is generally sensitive to temperature, the semiconductor laser 34 is thermal-insulated by the thermal insulator 41 and, further, is cooled by the Peltier-effect element 44. Moreover, the partition plate 45 prevents a dust adhering to the stator 4 from adhering to the article 17, to isolate generated heat of the stator 4.

Further, grease scattered from the second bearing 10 is accumulated in the oil accumulating groove 24a in the presser plate 24. Furthermore, the small gap between the inner periphery 24b and the outer periphery 46a of the slinger 46 prevents the grease from being scattered to the article 17. Moreover, the presser plate 24 presses the second bearing 10 down. Accordingly, since a thermal expansion of the rotary shaft 2 is practiced with the second bearing 10 serving as a reference point, axial movement of the article 17 is reduced.

Further, the inspecting window 8b is provided for inspecting the gap between the convex lenses 36 and 39 and the surface 17a of the article 17. In the case where a dimension or size of the gap is checked, insertion of a gage (not shown) is practiced. Furthermore, since the thermal insulating plate 41 and the screws 43 for fixedly mounting the mounting table 42 are an electric insulator, the printed circuit board 21 is insulated electrically from the second bracket 8. Thus, even if ground potential of the second bracket 8 fluctuates, potential of the signal processing circuit 22 arranged on the printed circuit board 21 does not fluctuate.

Figure 13:
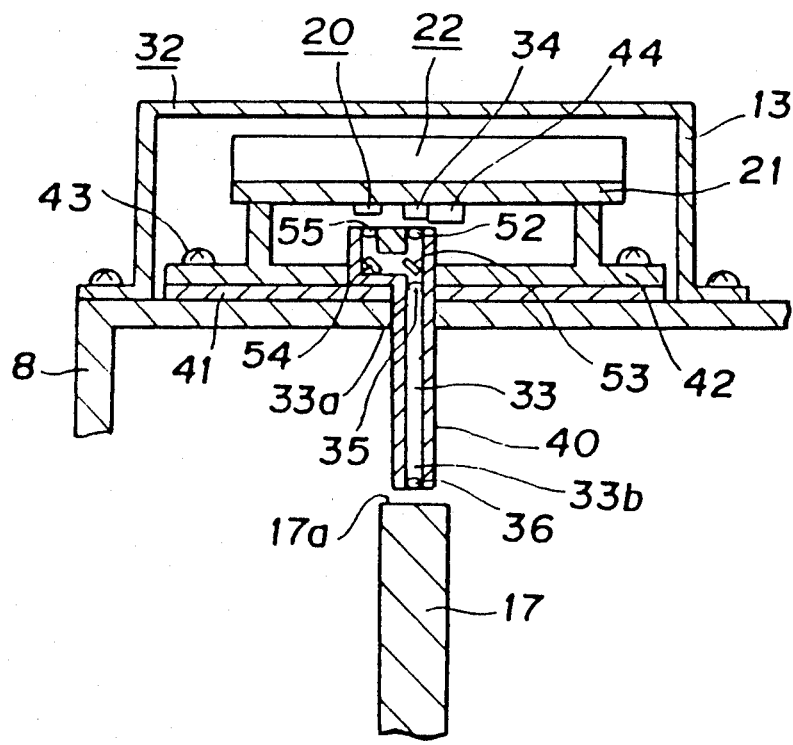
FIG. 13 is a fragmentary longitudinal cross-sectional view showing an arrangement of an encoder section according to another embodiment of the invention.

In the above embodiment, the emitted-light optical fiber 33 and the reflected-light optical fiber 37 are provided. As shown in FIG. 13, however, the single optical fiber 33 is used both as an emitted-light optical fiber and a reflected-light optical fiber, and a convex lens 52, a beam splitter 53, a mirror 54 and a convex lens 55 are arranged between the semiconductor laser 34 and the convex lens 35. Thus, the light from the semiconductor laser 34 is condensed by the convex lens 52, passes through the beam splitter 53, and is incident upon the combined-use optical fiber 33 to irradiate the surface 17a of the article 17.

A light reflected from the surface 17a of the article 17 is incident upon the combined-use optical fiber 33, is bent perpendicularly by the beam splitter 53, is further bent perpendicularly by the mirror 54, is condensed by the convex lens 55, and is incident upon the light receiving element 20. Accordingly, there can be produced, by the single optical fiber, advantages similar to those of the aforesaid first embodiment.

Figure 14:
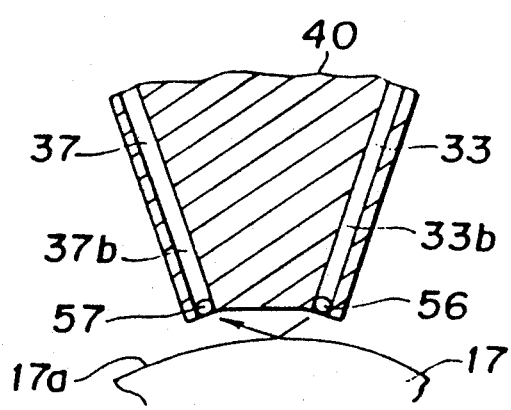
FIG. 14 is a fragmentary lateral cross-sectional view showing the neighborhood of one ends of respective emitted-light and reflected-light optical fibers according to still another embodiment of the invention.
Figure 15:
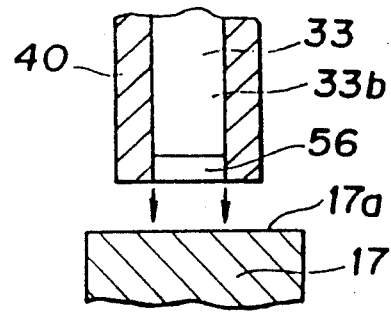
FIG. 15 is a fragmentary longitudinal cross-sectional view showing the neighborhood of the one end of the emitted-light optical fiber according to the still another embodiment of the invention illustrated in FIG. 14.

FIG. 14 is an enlarged lateral cross-sectional view showing the neighborhood of the one end 33b of the emitted-light optical fiber 33, and FIG. 15 is a longitudinal cross-sectional view of portions illustrated in FIG. 14. Since a pair of cylindrical lenses 56 and 57 place their respective long focuses in the rotational-axis direction with respect to the surface 17a of the article 17, it is possible to detect the surface properties of the surface 17a of the article 17 over a wide range. Thus, reliability of the signal can be improved.

Figure 16:
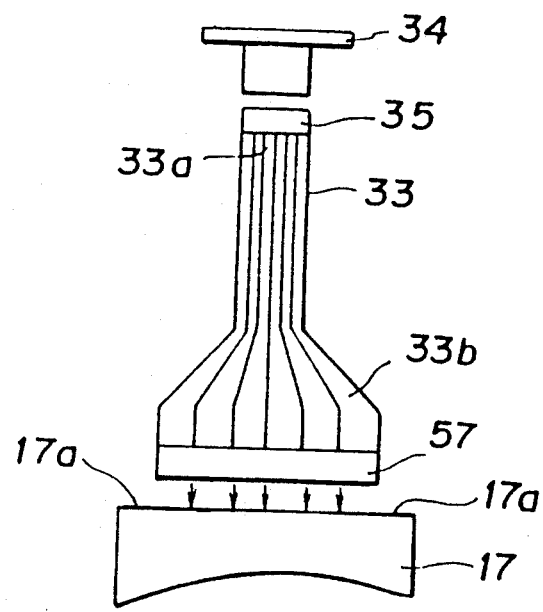
FIG. 16 is a longitudinal cross-sectional view showing an arrangement of an emitted-light optical fiber according to another embodiment of the invention.
Figure 17:
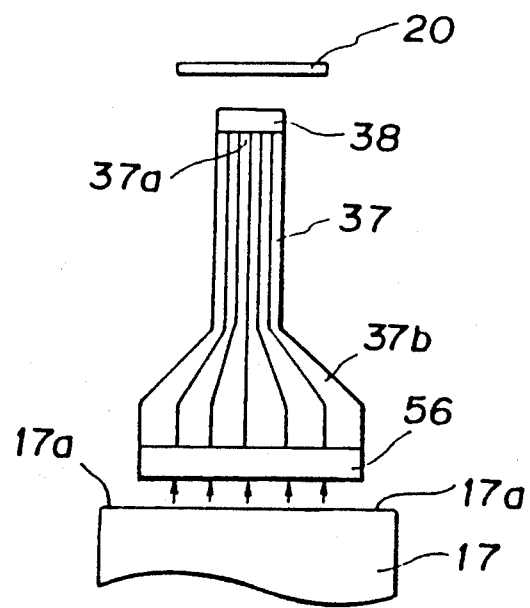
FIG. 17 is a longitudinal cross-sectional view showing an arrangement of a reflected-light optical fiber according to the another embodiment of the invention illustrated in FIG. 16.

FIGS. 16 and 17 show an embodiment in which a plurality of emitted-light optical fibers 33 and a plurality of reflected-light optical fibers 37 have their respective cores, that is, optical fibers 33 and 37 are brought to a multi-core arrangement. One set of ends 33a of the emitted-light optical fibers 33 on the side of the semiconductor laser 34 are bundled up, and one set of ends 37a of the reflected-light optical fibers 37 on the side of the light receiving element 20 are also bundled up. The other ends 33b and 37b of the respective emitted-light and reflected-light optical fibers 33 and 37 are arranged perpendicularly with respect to the rotational direction of the article 17, and cylindrical lenses 56 and 57 are arranged adjacent respectively to the other ends 33b and 37b. Thus, it is possible to detect the surface properties of the surface 17a over a wide range.

Figure 18:
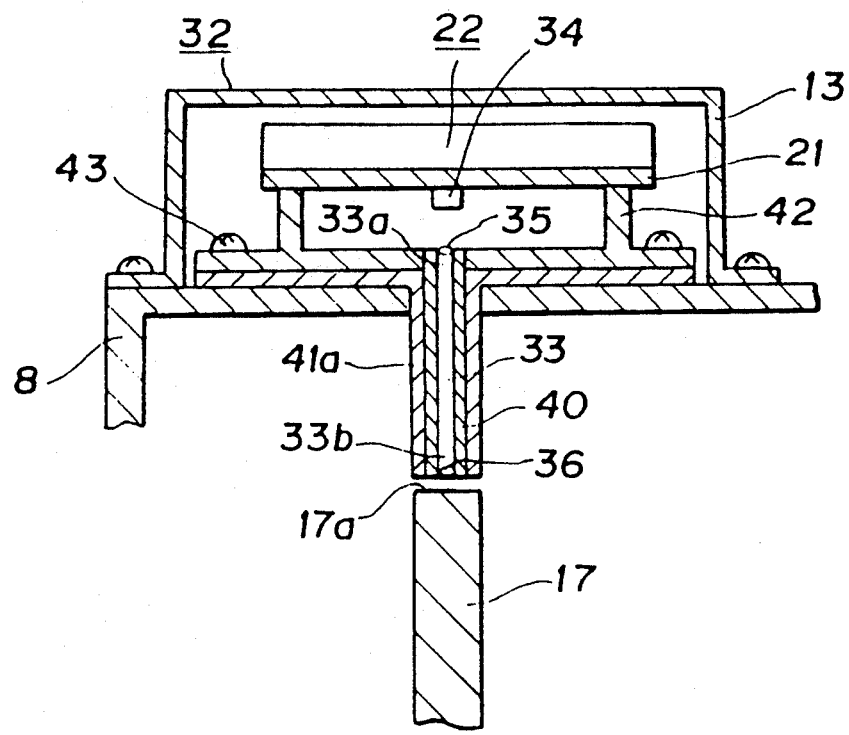
FIG. 18 is a longitudinal cross-sectional view showing an arrangement of an encoder section according to still another embodiment of the invention.

Further, as illustrated in FIG. 18, a part of the thermal insulator 41 is elongated to form a thermal insulator 41a, and the emitted-light optical fiber 33 and the reflected-light optical fiber 37 (cannot be seen in FIG. 18) are covered with the thermal insulator 41a. Accordingly, a temperature rise of the optical fibers 33 and 37 is restrained, and a degradation rate due to the temperature rise is reduced. As a result, it is possible to use optical fibers made of a plastic material that are low in cost. Furthermore, since the thermal insulator 41a can be formed integrally with the thermal insulator 41, the cost can be reduced.

Moreover, since the surface 17a of the article 17 is subjected to rust-preventive treatment or preservative treatment such as gold plating or the like, the reflected light becomes intensive due to the gold plating so that it is possible to obtain a larger output. Further, since degradation of the surface 17a can be prevented from occurring by the rustpreventive treatment, the reliability can be improved.

Figure 19:
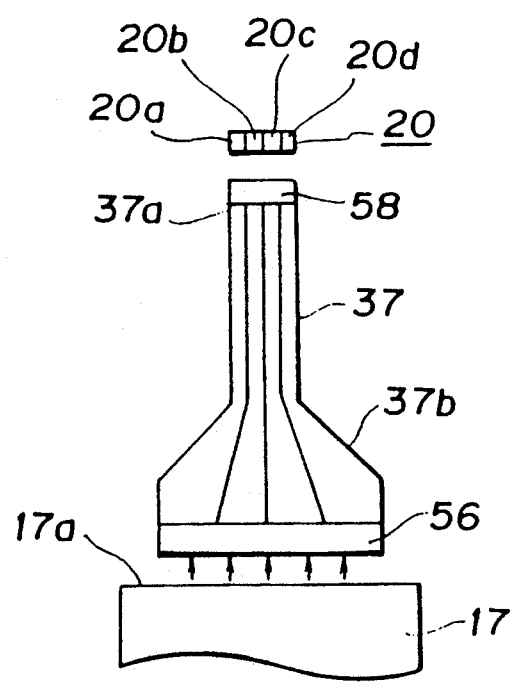
FIG. 19 is a longitudinal cross-sectional view showing an arrangement of a reflected-light optical fiber according to another embodiment of the invention.

FIG. 19 illustrates an arrangement in which a plurality of reflected-light optical fibers 37 have their respective cores, a pair of cylindrical lenses 56 and 58 are arranged adjacent respectively to the article 17 and the light receiving element 20, and the light-receiving element 20 is divided into a plurality of light-receiving elements 20a through 20d.

Figure 20:
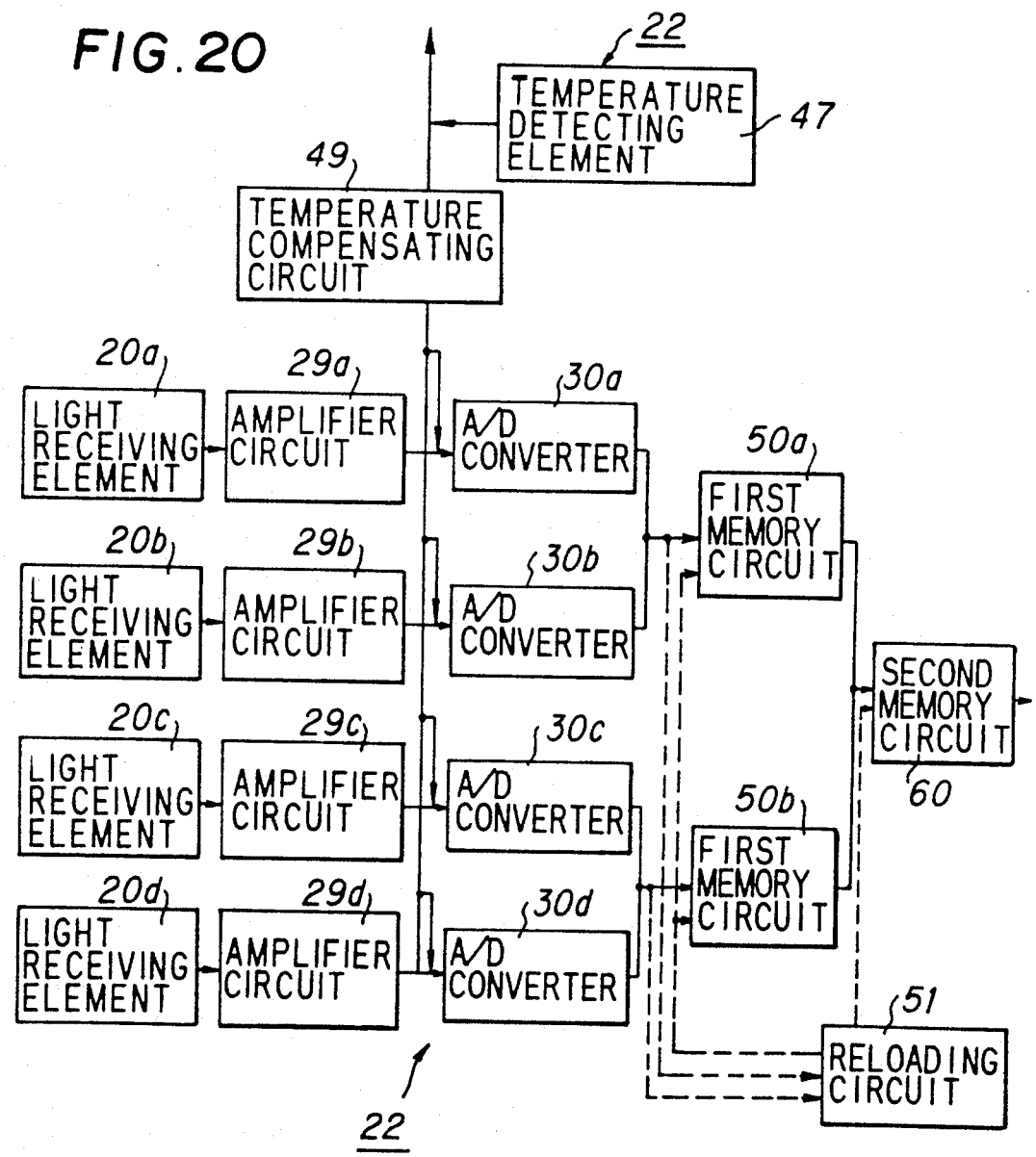
FIG. 20 is a block diagram showing an arrangement of a signal processing circuit according to the another embodiment illustrated in FIG. 19.
Figure 21:
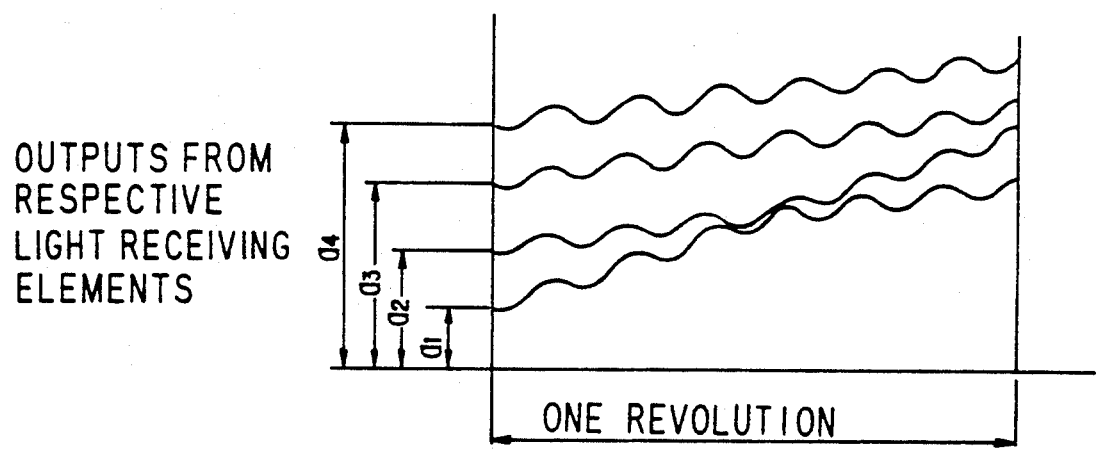
FIG. 21 is a graphical representation showing an output from the divided light receiving elements illustrated in FIG. 19.

FIG. 20 shows an arrangement of the signal processing circuit 22 in the embodiment illustrated in FIG. 19. The arrangement is such that outputs (refer to FIG. 21) from the respective divided light receiving elements 20a~20d are amplified respectively by amplifier circuits 29a~29d, the amplified signals are converted respectively to the digital values by A/D converters 30a~30d, outputs from the respective A/D converters 30a and 30b are inputted respectively into predetermined addresses of a first memory circuit 50a, outputs from the respective A/D converters 30c and 30d are inputted respectively into predetermined addresses of a first memory circuit 50b, and outputs form the respective first memory circuits 50a and 50b are inputted respectively into predetermined addresses of a second memory circuit 60, to produce an output. Accordingly, detecting information increases as compared with the aforesaid first embodiment, and equalization of the rotational-angle information is practiced. Thus, reliability of the rotational-angle information can be improved.

Figure 22:
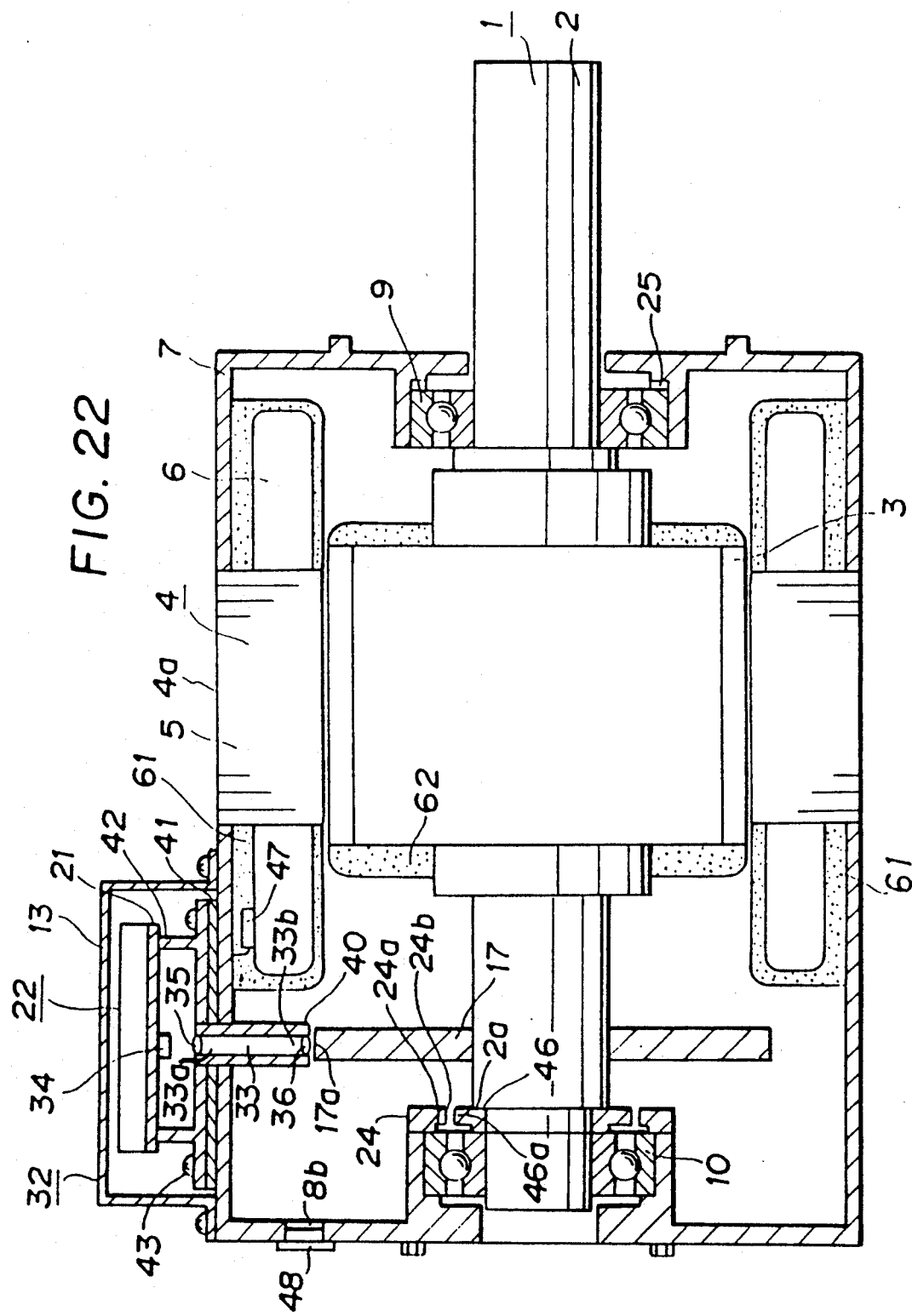
FIG. 22 is a longitudinal cross-sectional view showing an arrangement of a servomotor according to still another embodiment of the invention.

As shown in FIG. 22, the stator 4 and the rotor 1 are molded respectively by resins 61 and 62. This reduces an exposed area of each of the stator 4 and the rotor 1. Thus, cleaning is made easy. Further, since the coil 6 is molded by the resin 61, heat from the coil 6 is liable to be heat-radiated from an envelope 4a of the stator 4. Thus, it is possible to restrain a temperature rise of the detecting unit 32.

Figure 23:
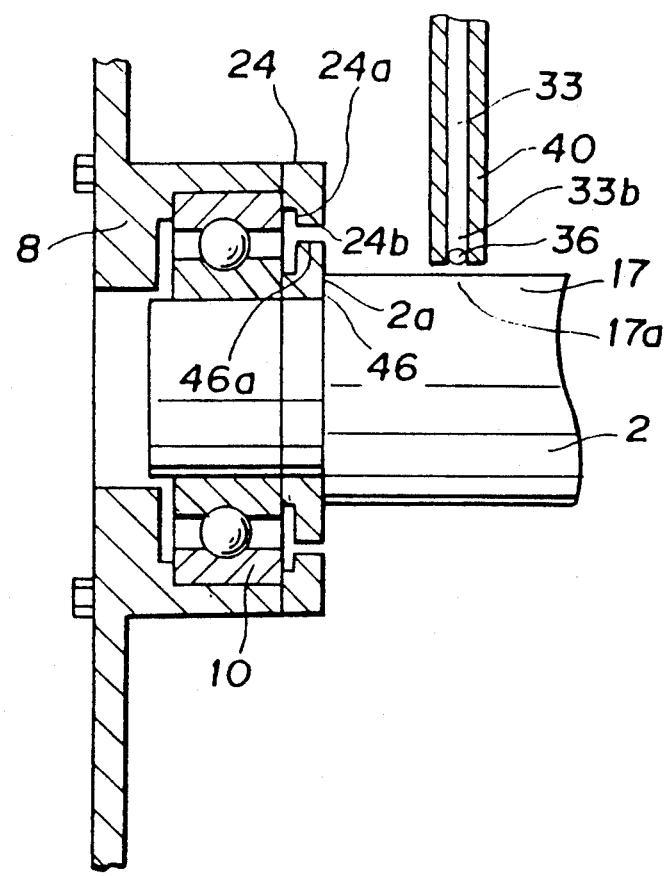
FIG. 23 is a fragmentary longitudinal cross-sectional view showing an arrangement of the neighborhood of an article to be detected according to another embodiment of the invention.

Subsequently, although, in the aforementioned first embodiment, the article 17 is fixedly mounted to the rotary shaft 2, the surface 2a of the rotary shaft 2 is utilized directly as an article to be detected as shown in FIG. 23, whereby parts or components can be reduced in number. Thus, there can be produced similar advantages.

Figure 24:
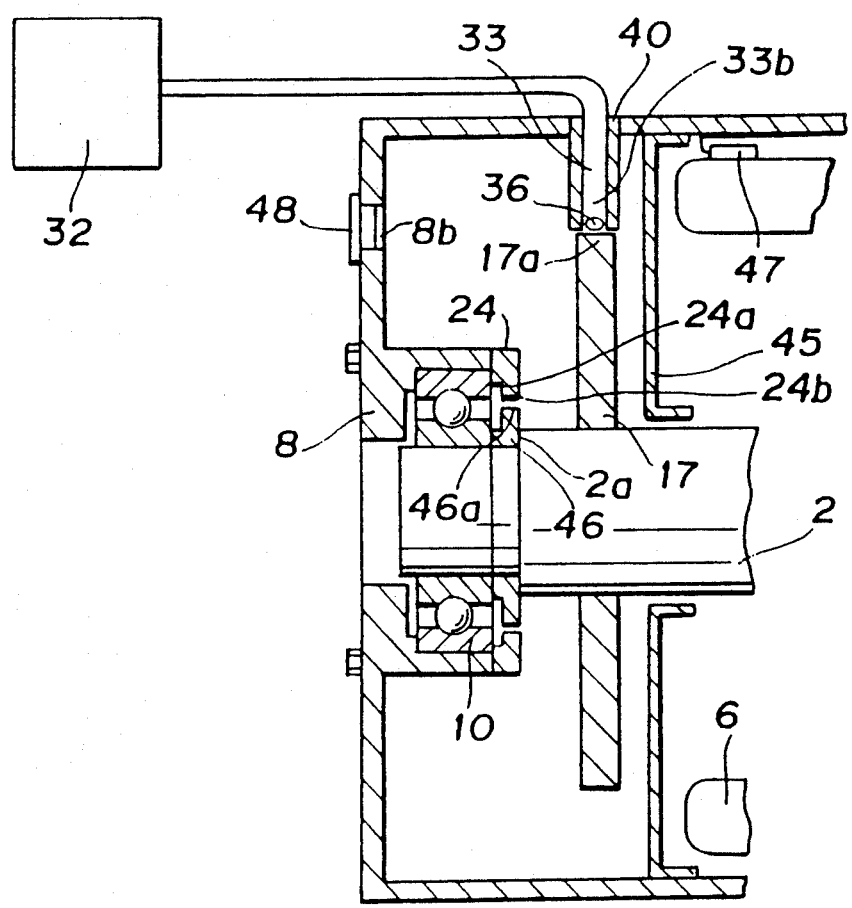
FIG. 24 is a longitudinal cross-sectional view showing an arrangement of the neighborhood of a detecting unit according to still another embodiment of the invention.

Furthermore, although, in the aforesaid first embodiment, the detecting unit 32 is fixedly mounted to the second bracket 8, the arrangement may be such that, as shown in FIG. 24, the detecting unit 32 is demounted from the second bracket 8, and the optical fiber 33 is extended so that the detecting unit 32 is mounted at a location spaced away from the servomotor.

Figure 25:
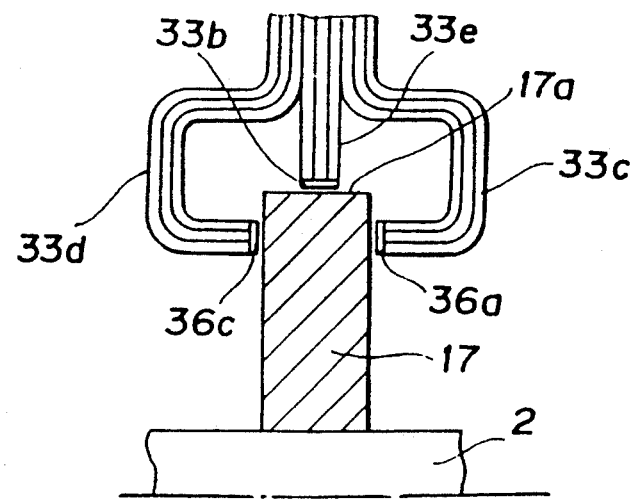
FIG. 25 is a fragmentary longitudinal cross-sectional view showing an arrangement of the neighborhood of an article to be detected according to another embodiment of the invention.

In the embodiment illustrated in FIGS. 16 and 17, each of the optical fibers 33 and 37 having their respective cores faces toward the article 17 at a single location. As shown in FIG. 25, however, if the optical fibers 33 are divided into a plurality of sets 33c, 33d and 33e, and if the optical fibers 33 face toward the article 17 from different directions, particularly, in such directions as to cancel vibration of the rotor 1, reliability of the rotational-angle information can further be improved.

In connection with the above, in the embodiments described previously, a magnet-type servomotor has been explained as an example. However, an induction-type servomotor and a direct-current-type servomotor can be utilized. Furthermore, in the above embodiment, the surface properties of the article are unspecific. However, there is no inconvenience or difficulty even if the surface properties are not unspecific. Moreover, a semiconductor position detector may be used as the light receiving element.

Although the invention has been described with respect to a specific embodiment for a complete and clear disclosure, the appended claims are not to be thus limited but are to be construed as embodying all modifications and alternative constructions that may occur to one skilled in the art which fairly fall within the basis teaching herein set forth.

What is claimed is:

1. A position detecting method comprising the steps of applying a laser light to surface irregularities formed during the machining of a surface of an article to be detected, receiving the laser light reflected from the surface irregularities, and comparing a signal of the received reflected light and a stored position signal of the article with each other, to detect a position of the article on the basis of the comparison results.

2. A position detecting method comprising the steps of applying a laser light to surface irregularities formed during the machining of a surface of an article to be detected, receiving the laser light reflected from the surface irregularities, temperature compensating a signal of the received reflected light, and comparing the signal after temperature compensating and a stored position signal of the article with each other, to detect a position of the article on the basis of the comparison results.

3. A position detecting apparatus comprising:
an article to be detected having surface irregularities formed during machining thereof;
applying means for applying a laser light to the surface irregularities of said article;
light receiving means for receiving the laser light reflected from the surface irregularities; and
comparator means for comparing a signal of the reflected light received by said light receiving means and a previously stored position signal of said article,
wherein a position of the article is detected on the basis of comparative results due to said comparator means.

4. A position detecting apparatus comprising:
a rotor having a rotary shaft;
a stator having a coil and a stationary iron core, said coil being wound about said stationary iron core;
a pair of first and second bearings for said rotary shaft;
a pair of first and second brackets for supporting said rotor with respect to said stator through the respective first and second bearings, said brackets having inner and outer surfaces;
an article to be detected having surface irregularities and fixedly mounted to a predetermined portion of said rotary shaft;
a detecting unit which is mounted to an outer surface of said second bracket;
emitted-light optical fiber means and reflected-light optical fiber means having one of their respective ends arranged in facing relation to said article, said emitted-light and reflected-light optical fiber means extending through said second bracket, the other ends of the respective emitted-light and reflected-light optical fiber means being arranged on the outer surface of said second bracket;
a semiconductor laser arranged in facing relation to the other end of said emitted-light optical fiber means;
laser-light receiving means arranged in facing relation to the other end of said reflected-light optical fiber means, for receiving a laser light reflected from said article; and
signal processing means for converting an output from said laser-light receiving means into an information signal.

5. A position detecting apparatus according to claim 4, including single optical fiber means used both as said emitted-light and reflected-light optical fiber means, and a beam splitter arranged between said semiconductor laser and one end of said single optical fiber means, wherein said laser-light receiving means is arranged on an optical axis of a branching reflected light from said beam splitter.

6. A position detecting apparatus according to claim 4, including cylindrical lens means arranged between the one ends of the respective emitted-light and reflected-light optical fiber means and the article.

7. A position detecting apparatus according to claim 4, wherein said emitted-light and reflected-light optical fiber means have their respective cores at one end arranged perpendicularly with respect to a rotational direction of said article, in an orientation focusing toward said article.

8. A position detecting apparatus according to claim 4, wherein said article has a surface toward which the one ends of the respective emitted-light and reflected-light optical fiber means face, said surface of said article being subjected to corrosion preventive treatment.

9. A position detecting apparatus according to claim 4, wherein said signal processing means includes at least memory means which stores therein actual rotational-angle information of a servomotor after completion of assembly.

10. A position detecting apparatus according to claim 9, wherein said memory means comprises a plurality of first memory means, and a plurality of second memory means having an input that is an output from a respective first memory means.

11. A position detecting apparatus according to claim 9, wherein said memory means is rewritable.

12. A position detecting apparatus according to claim 4, further comprising temperature compensating means in addition to said signal processing means, wherein said stator includes a temperature detecting element, and wherein a temperature information signal inputted into said temperature compensating means is a signal from said temperature detecting element of said stator.

13. A position detecting apparatus according to claim 4, wherein at least one of said stator and said rotor is molded by resin.

14. A position detecting apparatus according to claim 4, further comprising partition plate means arranged between said article and said stator and fixedly mounted to said second bracket, wherein a small gap is defined between said partition plate means and said rotor.

15. A position detecting apparatus according to claim 4, further comprising presser plate means, said second bearing fitted in said second bracket being fixedly mounted to said second bracket in a rotational-axis direction by said presser plate means, and slinger means arranged between said second bearing and a shoulder of said rotary shaft, wherein a gap is defined between an outer periphery of said slinger means and an inner periphery of said presser plate means to form an oil accumulating groove in said presser plate means.

16. A position detecting apparatus according to claim 4, wherein said rotary shaft has an outer periphery which comprises said article to be detected.

17. A position detecting apparatus according to any one of claims 4 and 5, wherein one of said emitted-light and reflected-light optical fiber means and said single optical fiber means is divided into a plurality of sets which face toward said article from a plurality of directions.

18. The apparatus of claim 17, wherein said rotor is used as said article.

19. A position detecting apparatus according to claim 4, wherein said second bracket is formed with an inspection window, said window being positioned to permit viewing of a gap defined between said article and said one respective ends of said emitted-light optical fiber means and said reflected-light optical fiber means.

20. A position detecting apparatus comprising:
a rotor having a rotary shaft;
a stator having a coil and a stationary iron core, said coil being wound about said stationary iron core;
a pair of first and second bearings for said rotary shaft;
an article to be detected having surface irregularities and fixedly mounted to a predetermined portion of said rotary shaft;
a detecting unit mounted in fixed relation to said stator;
emitted-light optical fiber means and reflected-light optical fiber means, each having ends, one of their respective ends being arranged in facing relation to said article;
a semiconductor laser arranged in facing relation to the other end of said emitted-light optical fiber means;
laser-light receiving means arranged in facing relation to the other end of said reflected-light optical fiber means, for receiving a laser light reflected from said article;
signal processing means for converting an output from said laser-light receiving means into an information signal; and
thermal insulating plate means arranged between said detecting unit and said rotor, and thermal insulator means with which said emitted-light and reflected-light optical fiber means are covered, wherein said thermal insulator means and said thermal insulating plate means are molded integrally with each other.

21. A position detecting apparatus according to claim 20, wherein said thermal insulating plate means serves as an electrical insulator, and wherein plurality of screws for fixedly mounting said detecting unit to said second bracket are formed of electrical insulating material.

22. A position detecting apparatus comprising:
a rotor having a rotary shaft;
a stator having a coil and a stationary iron core, said coil being wound about said stationary iron core;
a pair of first and second bearings for said rotary shaft;
an article to be detected having surface irregularities and fixedly mounted to a predetermined portion of said rotary shaft;
a detecting unit mounted in fixed relation to said stator;
emitted-light optical fiber means and reflected-light optical fiber means, each having ends, one of their respective ends being arranged in facing relation to said article;
a semiconductor laser arranged in facing relation to the other end of said emitted-light optical fiber means;
laser-light receiving means arranged in facing relation to the other end of said reflected-light optical fiber means, for receiving a laser light reflected from said article;
signal processing means for converting an output from said laser-light receiving means into an information signal; and
a cooling element which cools said semiconductor laser.

23. A position detecting apparatus according to claim 22, wherein said cooling element is a Peltier-effect element.

24. A position detecting apparatus for a servomotor comprising:
a rotor having a rotary shaft;
a stator having a coil and a stationary iron core, said coil being wound about said stationary iron core;
a pair of first and second bearings for said rotary shaft;
a pair of first and second brackets for supporting said rotor with respect to said stator through the respective first and second bearings;
an article to be detected having surface irregularities and fixedly mounted to a predetermined portion of said rotary shaft;
a detecting unit arranged separately from the servomotor;
emitted-light optical fiber means and reflected-light optical fiber means, each having ends, one of their respective ends being arranged in facing relation to said article, said emitted-light and reflected-light optical fiber means extending through said second bracket, the other respective ends being connected with said detecting unit;

a semiconductor laser arranged in facing relation to the other end of said emitted-light optical fiber means;

laser-light receiving means arranged in facing relation to the other end of said reflected-light optical fiber means, for receiving a laser light reflected from said article; and signal processing means for converting an output from said laser-light receiving means into an information signal.

25. A position detecting apparatus for a servomotor comprising:

a rotor having a rotary shaft;

a stator having a coil and a stationary iron core, said coil being wound about said stationary iron core;

a pair of first and second bearings for said rotary shaft;

a pair of first and second brackets for supporting said rotor with respect to said stator through the respective first and second bearings;

an article to be detected having surface irregularities and fixedly mounted to a predetermined portion of said rotary shaft;

a detecting unit located in spaced relation to the servomotor;

emitted-light optical fiber means and reflected-light optical fiber means, each having ends, one of their respective ends being arranged in facing relation to said article, said emitted-light and reflected-light optical fiber means extending through said second bracket to said detecting unit;

a semiconductor laser arranged in facing relation to the other end of said emitted-light optical fiber means;

laser-light receiving means arranged in facing relation to the other end of said reflected-light optical fiber means, for receiving a laser light reflected from said article; and signal processing means for converting an output from said laser-light receiving means into an information signal.

26. A position detecting apparatus comprising:

a rotor having a rotary shaft;

a stator having a coil and a stationary iron core, said coil being wound about said stationary iron core;

a pair of first and second bearings for said rotary shaft;

a pair of first and second brackets for supporting said rotor with respect to said stator through the respective first and second bearings which are mounted respectively to said first and second brackets;

an article to be detected having surface properties formed unintentionally during surface processing;

a detecting unit which is mounted to an outer surface of said second bracket;

emitted-light optical fiber means and reflected-light optical fiber means having one of their respective ends arranged in facing relation to said article, said emitted-light and reflected-light optical fiber means extending through said second bracket, the other ends of the respective emitted-light and reflected-light optical fiber means being arranged on the outer surface of said second bracket;

a semiconductor laser arranged in facing relation to the other end of said emitted-light optical fiber means;

laser-light receiving means arranged in facing relation to the other end of said reflected-light optical fiber means, for receiving a laser light reflected from said article; and signal processing means for converting an output from said laser-light receiving means into an information signal, wherein said rotor is used as said article.

27. A position detecting method comprising the steps of:

applying a laser light to surface irregularities formed during processing of an article to be detected, receiving the laser light reflected from the surface irregularities, and comparing a signal of the received reflected light and a stored position signal of the article with each other, to detect a position of the article on the basis of the comparison results.

* * * * *